(12) United States Patent
Hao et al.

(10) Patent No.: US 8,155,627 B2
(45) Date of Patent: Apr. 10, 2012

(54) VISUAL VOICEMAIL PROVISIONING AND NOTIFICATION

(75) Inventors: Jack Jianxiu Hao, Lexington, MA (US); Chris Helbling, Norwalk, CT (US); Gaurav D. Mehta, Brighton, MA (US); Michael R. Oliver, Wayne, NJ (US); Guillermo Ortiz, Brookline, MA (US); Okeno Palmer, Woburn, MA (US); Dahai Ren, Waltham, MA (US); Diego S. Rozensztejn, Brookline, MA (US); Atul Thaper, Flemington, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 725 days.

(21) Appl. No.: 12/265,910

(22) Filed: Nov. 6, 2008

(65) Prior Publication Data

US 2009/0156176 A1    Jun. 18, 2009

Related U.S. Application Data

(60) Provisional application No. 61/013,549, filed on Dec. 13, 2007, provisional application No. 61/018,044, filed on Dec. 31, 2007.

(51) Int. Cl.
*H04W 4/12* (2009.01)
(52) U.S. Cl. ......... 455/412.2; 455/413; 379/88.22; 379/88.13

(58) Field of Classification Search ......... 455/412.2, 455/413; 379/88.13, 88.22
See application file for complete search history.

(56) References Cited

U.S. PATENT DOCUMENTS

| | | | |
|---|---|---|---|
| 6,181,781 | B1 | 1/2001 | Porter et al. |
| 2005/0108360 | A1 | 5/2005 | Zellner |
| 2007/0117546 | A1 | 5/2007 | Doulton |
| 2007/0206734 | A1 | 9/2007 | Hagale et al. |
| 2007/0207785 | A1 | 9/2007 | Chatterjee et al. |
| 2010/0189229 | A1* | 7/2010 | Sigmund et al. ......... 379/88.22 |
| 2010/0279660 | A1* | 11/2010 | Ahlin et al. ......... 455/412.2 |

OTHER PUBLICATIONS

Co-Pending Application entitled "Self-Provisioning, Notification, Retrieval, and Submission of Visual Voice Mail", filed Nov. 6, 2008, 36 pages.
Notification of Transmittal of the International Search Report and the Written Opinion of the International Searching Authority, or the Declaration corresponding to PCT/US 08/84517, Jan. 12, 2009, 12 pages.

* cited by examiner

*Primary Examiner* — Phuoc Doan

(57) ABSTRACT

A device receives, from a user device, a request to use a visual voicemail (VVM) application, directs the user device to a self provisioning server based on the request, and receives, from the self provisioning server, a selected VVM subscription plan and information associated with a user of the user device. The device also provides, to a billing system, a feature code associated with the selected VVM subscription plan, receives, from one or more voicemail servers, pre-existing voicemail messages associated with the user, and provides, to the user device, the pre-existing voicemail messages.

25 Claims, 14 Drawing Sheets

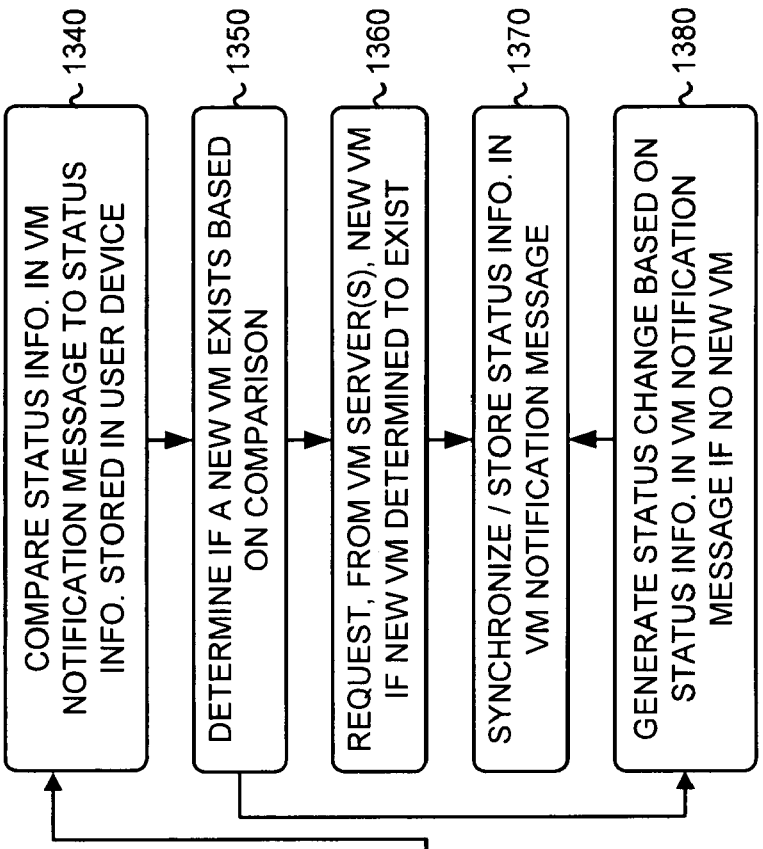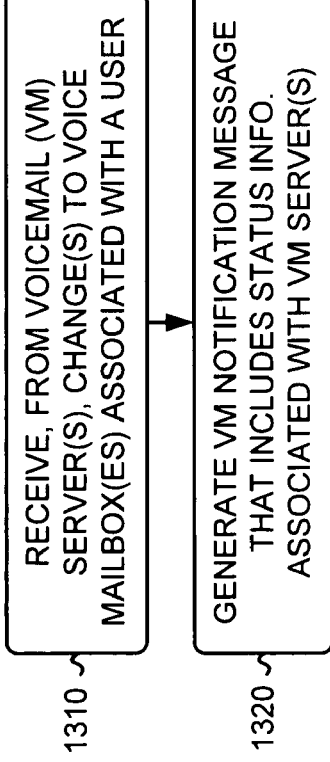
FIG. 13

VISUAL VOICEMAIL PROVISIONING AND NOTIFICATION

RELATED APPLICATIONS

This application claims priority to U.S. Provisional Patent Application No. 61/013,549, filed Dec. 13, 2007, and U.S. Provisional Patent Application No. 61/018,044, filed Dec. 31, 2007, the disclosures of which are incorporated by reference herein in their entireties.

BACKGROUND

Visual voicemail (VVM) is a user friendly application that adds a visual aspect to managing voicemail messages. Traditional telephone user interface (TUI) voicemail requires users to dial into a system to listen to voicemails in a sequential order. Visual voicemail may enable mobile phone users to manage voicemail message in an order of their choice, e.g., in a random order rather than a sequential order.

BRIEF DESCRIPTION OF THE DRAWINGS

FIGS. 11-14 depict flow charts of exemplary processes according to implementations described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may enable a user to provision a visual voicemail (VVM) application from a variety of user devices (e.g., a cell phone, a personal digital assistant (PDA), a television, an Internet-based device, etc.), and may enable the VVM application to notify the user devices when a new voicemail arrives while minimizing data transfers with network devices (e.g., backend servers). In one implementation, for example, the systems and/or methods may receive, from a user device, a request to use a visual voicemail (VVM) application, may direct the user device to a self provisioning server based on the request, and may receive, via the self provisioning server, a selected VVM plan and information associated with a user of the user device. The systems and/or methods may determine if the user is a new user of the VVM application, may request a voicemail greeting from the user device when the user is new, and may receive, from the user device, a voicemail recording when the user is new. The systems and/or methods may provide, to a billing system, a feature code associated with the selected VVM plan, may receive, from one or more voicemail servers, pre-existing voicemail messages associated with the user, and may provide, to the user device, the pre-existing voicemail messages.

As used herein, the term "user" is intended to be broadly interpreted to include a user device or a user of a user device.

Figure 1:
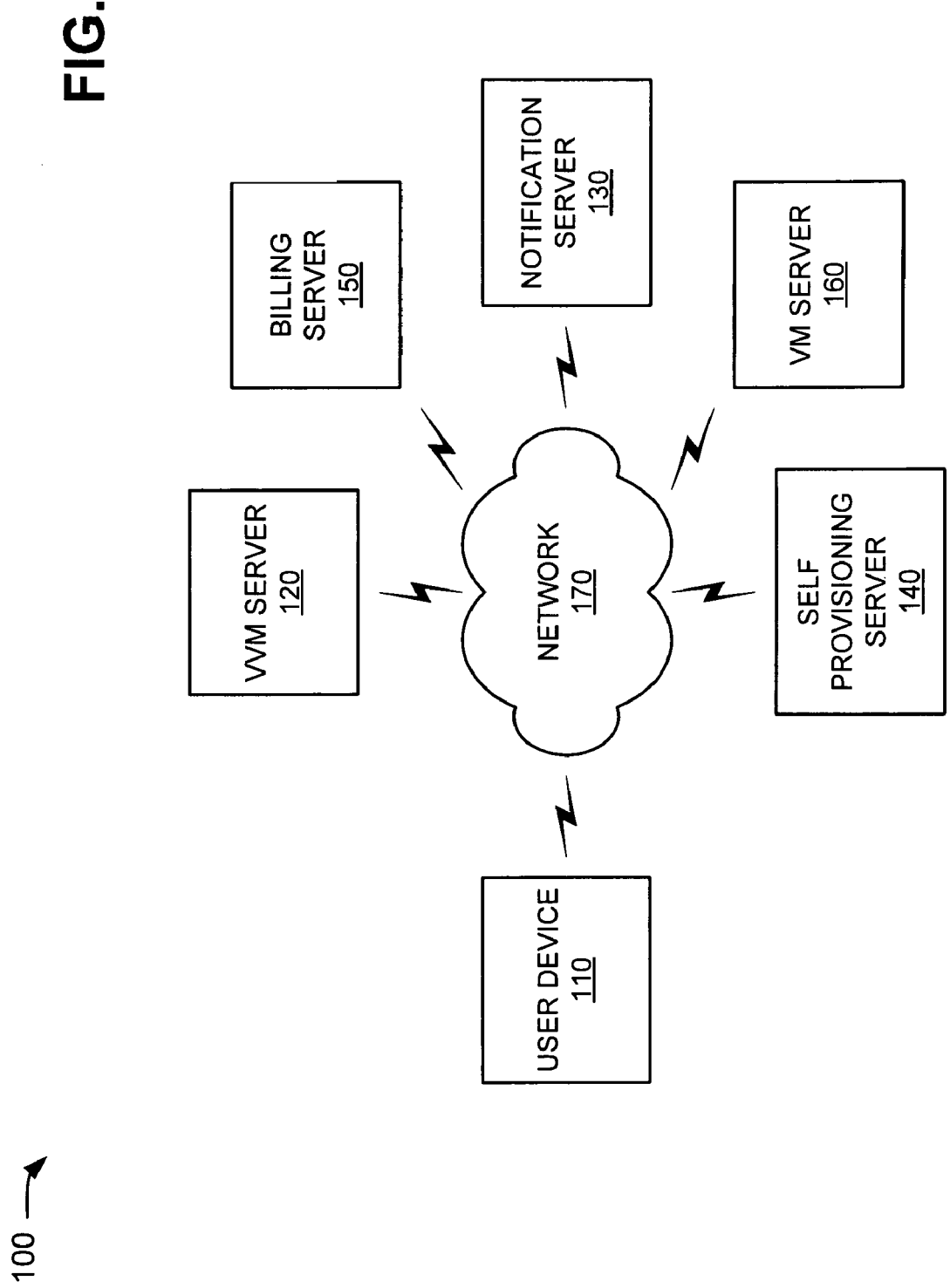
FIG. 1 depicts a diagram of an exemplary network in which systems and/or methods described herein may be implemented.

FIG. 1 is a diagram of an exemplary network 100 in which systems and/or methods described herein may be implemented. As illustrated, network 100 may include a user device 110, a visual voicemail (VVM) server 120, a notification server 130, a self provisioning server 140, a billing server 150, and a voicemail (VM) server 160 interconnected by a network 170. Components of network 100 may interconnect via wired and/or wireless connections. A single user device 110, VVM server 120, notification server 130, self provisioning server 140, billing server 150, VM server 160, and network 170 have been illustrated in FIG. 1 for simplicity. In practice, there may be more user devices 110, VVM servers 120, notification servers 130, self provisioning servers 140, billing servers 150, VM servers 160, and/or networks 170. Also, in some instances, one or more of the components of network 100 may perform one or more functions described as being performed by another one or more of the components of network 100.

User device 110 may include any device that is capable of accessing servers 120-160 via network 170. For example, user device 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a personal computer, a set-top box (STB), a television, a personal gaming system, or other types of computation or communication devices, threads or processes running on these devices, and/or objects executable by these devices. User device 110 may enable a user to provision and utilize a VVM application (e.g., provided by VVM server 120), and may receive notifications when a new voicemail arrives. For example, if user device 110 is web-based device, user device 110 (e.g., via a web browser) may permit a user to view, listen to, and/or manage voicemails through a hypertext transfer protocol over secure socket layer (HTTPS) on the Internet. If user device 110 is a cell phone, user device 110 may implement a Java-based VVM application that may permit a user to view, listen to, and/or manage voicemails.

VVM server 120 may include one or more server entities, or other types of computation or communication devices, that gather, process, search, and/or provide information in a manner described herein. VVM server 120 may provide a VVM application to user device 110, may interface with, either directly or via a device proxy server (not shown), user device 110, and may interface with other backend servers (e.g., notification server 130, self provisioning server 140, billing server 150, and VM server 160). VVM server 120 may convert requests from user device 110 into a format that the backend servers may understand, and may aggregate different voicemail systems (e.g., provided by VM server 160), such as home, office, and wireless voicemail systems.

In one implementation, VVM server 120 may receive, from user device 110, a request to use the VVM application, may direct user device 110 to self provisioning server 140 based on the request, and may receive, via self provisioning server 140, a selected VVM plan and information associated with a user of user device 110. VVM server 120 may determine if the user is a new user of the VVM application, may request a voicemail greeting from user device 110 when the user is new, and may receive, from user device 110, a voicemail recording when the user is new. VVM server 120 may provide, to billing server 150, a feature code associated with the selected VVM plan, may receive, from VM server 160, pre-existing voicemail messages associated with the user, and may provide, to user device 110, the pre-existing voicemail messages.

In another implementation, VVM server 120 may receive, from VM server 160, a notification of a new voicemail, and may retrieve, from VM server 160, a number of voicemails, a number of unheard voicemails, and a list of voicemail identifiers (IDs). VVM server 120 may provide, to user device 110, the number of voicemails, the number of unheard voicemails, and the list of the voicemail IDs so that user device 110 may compare the list of voicemail IDs with a list of voicemail IDs stored on user device 110 in order to determine the new voicemail.

Notification server 130 may include one or more server entities, or other types of computation or communication devices, that gather, process, search, and/or provide information in a manner described herein. In one exemplary implementation, notification server 130 may receive, from VM server 160, a change to a voice mailbox associated with a user, and may generate a voicemail notification message that includes status information (e.g., a number of voicemails, a number of unheard voicemails, voicemail identifiers, etc.) associated with VM server 160. Notification server 130 may provide the voicemail notification message to user device 110 associated with the user. User device 110 may compare the status information with status information stored on user device 110 to determine if a new voicemail exists. If a new voicemail exists, user device 110 may request the new voicemail from VM server 160. Otherwise, user device 110 may generate a status change based on the status information provided in the voicemail notification message. Such an arrangement may minimize data transfers between user device 110 and the backend servers (e.g., to VM server 160).

Self provisioning server 140 may include one or more server entities, or other types of computation or communication devices, that gather, process, search, and/or provide information in a manner described herein. Self provisioning server 140 may enable user device 110 to self provision (e.g., provide, establish, download, set up, etc.) the VVM application provided by VVM server 120. In one exemplary implementation, self provisioning server 140 may offer a user (e.g., a new user of the VVM application) associated with user device 110 a choice VVM subscription plans (e.g., with different prices, options, features, etc.). Self provisioning server 140 may receive, from user device 110, a selected VVM subscription plan and/or information associated with the user and/or user device 110 (e.g., account information, telephone number, a user profile, etc.), and may confirm the selected VVM subscription plan.

Billing server 150 may include one or more server entities, or other types of computation or communication devices, that gather, process, search, and/or provide information in a manner described herein. Billing server 150 may provide billing services (e.g., account management, bill generation, etc.) for services (e.g., VVM services) provided by network 100. In one exemplary implementation, billing server 150 may receive a feature code (e.g., a code identifying a VVM subscription plan selected by a user of user device 110), and may provide a service order (e.g., an order for the VVM subscription plan) associated with the feature code to self provisioning server 140.

VM server 160 may include one or more server entities, or other types of computation or communication devices, that gather, process, search, and/or provide information in a manner described herein. VM server 160 may provide voice mailboxes for home, office, or wireless devices (e.g., user device 110), and may provide a service wide directory for voice mailbox location lookup. The service wide directory may provide telephone numbers, locations of voice mailboxes, and/or other information associated with home, office, or wireless devices. In one exemplary implementation, VVM server 120 may aggregate one or more voice mailboxes (e.g., provided by VM server 160) associated with a user of user device 110. VM server 160 may provide voicemail messages from the one or more voice mailboxes to VVM server 120 for display to user device 110 via the VVM application.

Network 170 may include a local area network (LAN), a wide area network (WAN), a metropolitan area network (MAN), a telephone network, such as the Public Switched Telephone Network (PSTN) or Public Land Mobile Network (PLMN), an intranet, the Internet, an optical fiber (or fiber optic)-based network, or a combination of networks.

Although not shown in FIG. 1, network 100 may include a variety of other components, such as a device proxy server, a transcoding server, an authentication server, a gateway server, etc. The device proxy server may connect to user device 110, may route requests from user device 110 to VVM server 120, the authentication server, the transcoding server, etc., and may convert content (e.g., voicemail lists, voicemail audio files, etc.) into a format that may be received by user device 110. The transcoding server may transcode an audio file into a format (e.g., MP3 format, QCP format, etc.) that may be played by user device 110. The authentication server may authenticate (e.g., via a login and/or password) a user associated with user device 110 if user device 110 attempts to access the device proxy server or VVM server 120. The authentication server may store user credentials and/or may retrieve user credentials from VM server 160. If the user is authenticated, the authentication server may issue a temporary session data certificate (e.g., a cookie) to user device 110 that may be used for further data calls between user device 110 and VVM server 120.

Figure 2:
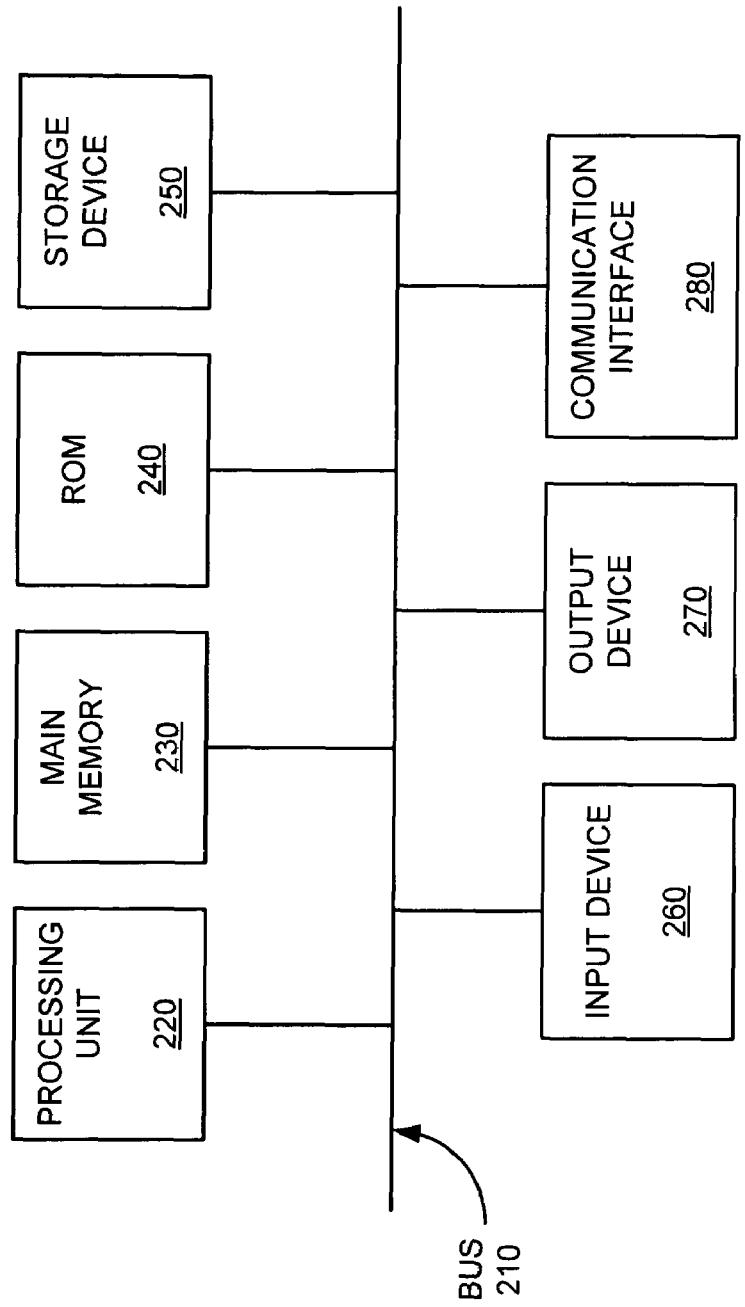
FIG. 2 illustrates a diagram of exemplary components of a visual voicemail (VVM) server, a notification server, a self provisioning server, and/or a voicemail (VM) server of the network depicted in FIG. 1.

FIG. 2 is an exemplary diagram of a device 200 that may correspond to VVM server 120, notification server 130, self provisioning server 140, billing server 150, and/or VM server 160. As illustrated, device 200 may include a bus 210, a processing unit 220, a main memory 230, a read-only memory (ROM) 240, a storage device 250, an input device 260, an output device 270, and/or a communication interface 280. Bus 210 may include a path that permits communication among the components of device 200.

Processing unit 220 may include a processor, microprocessor, or other type of processing unit that may interpret and execute instructions. Main memory 230 may include a random access memory (RAM) or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, a remote control, a touch screen, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network, such as network 170.

As described herein, device 200 may perform certain operations in response to processing unit 220 executing software instructions contained in a computer-readable medium, such as main memory 230. A computer-readable medium may be defined as a physical or logical memory device. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, or additional components than depicted in FIG. 2. In still other implementations, one or more components of device 200 may perform one or more other tasks described as being performed by one or more other components of device 200.

Figure 3:
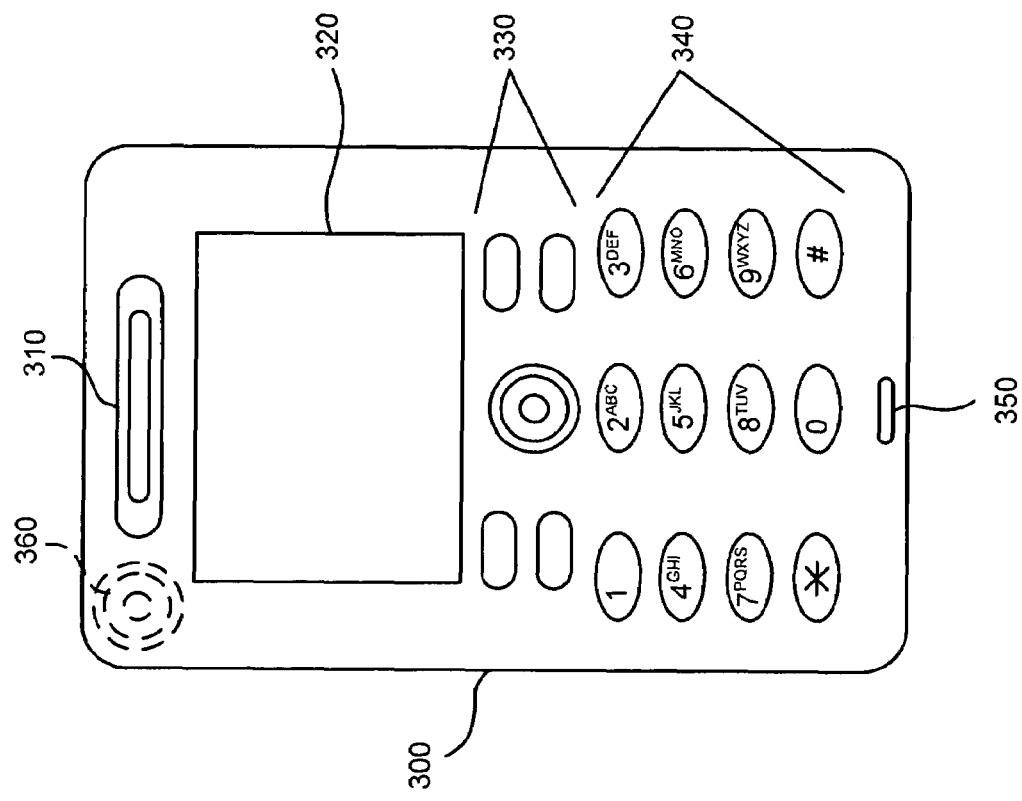
FIG. 3 depicts a diagram of an exemplary user device of the network illustrated in FIG. 1.

FIG. 3 depicts a diagram of an exemplary user device 110. As illustrated, user device 110 may include a housing 300, a speaker 310, a display 320, control buttons 330, a keypad 340, a microphone 350, and/or a camera 360. Housing 300 may protect the components of user device 110 from outside elements. Speaker 310 may provide audible information to a user of user device 110.

Display 320 may provide visual information to the user. For example, display 320 may display text input into user device 110, text, images, video, and/or graphics received from another device, and/or information regarding incoming or outgoing calls or text messages, emails, media, games, phone books, address books, the current time, etc. Control buttons 330 may permit the user to interact with user device 110 to cause user device 110 to perform one or more operations. For example, control buttons 330 may be used to cause user device 110 to transmit information. Keypad 340 may include a standard telephone keypad. Microphone 350 may receive audible information from the user. Camera 360 may be provided on a back side of user device 110, and may enable user device 110 to capture and/or store video and/or images (e.g., pictures).

Although FIG. 3 shows exemplary components of user device 110, in other implementations, user device 110 may contain fewer, different, or additional components than depicted in FIG. 3. In still other implementations, one or more components of user device 110 may perform one or more other tasks described as being performed by one or more other components of user device 110.

Figure 4:
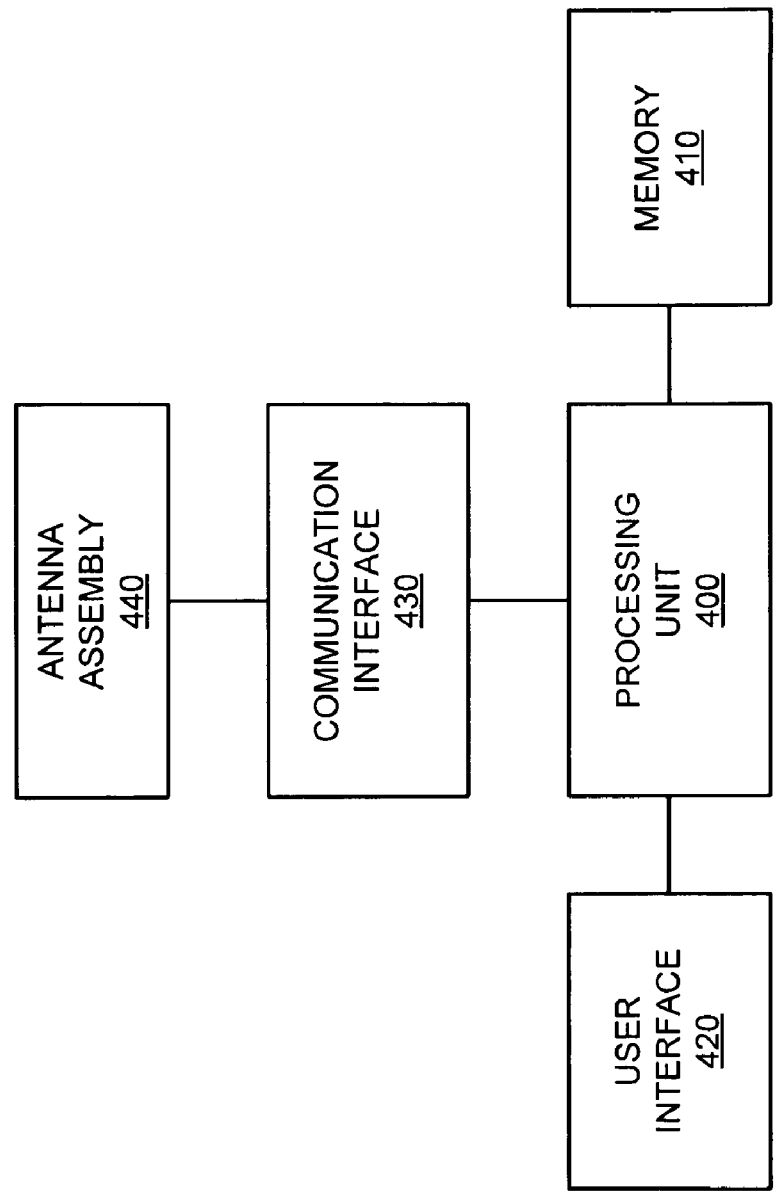
FIG. 4 illustrates a diagram of exemplary components of the user device depicted in FIG. 3.

FIG. 4 is a diagram of exemplary components of user device 110. As illustrated, user device 110 may include a processing unit 400, memory 410, a user interface 420, a communication interface 430, and/or an antenna assembly 440.

Processing unit 400 may include a processor, a microprocessor, an application specific integrated circuit (ASIC), a field programmable gate array (FPGA), or the like. Processing unit 400 may control operation of user device 110 and its components. In one implementation, processing unit 400 may control operation of components of user device 110 in a manner described herein.

Memory 410 may include a random access memory (RAM), a read-only memory (ROM), and/or another type of memory to store data and instructions that may be used by processing unit 400.

User interface 420 may include mechanisms for inputting information to user device 110 and/or for outputting information from user device 110. Examples of input and output mechanisms might include buttons (e.g., control buttons 330, keys of keypad 340, a joystick, etc.) or a touch screen interface to permit data and control commands to be input into user device 110; a speaker (e.g., speaker 310) to receive electrical signals and output audio signals; a microphone (e.g., microphone 350) to receive audio signals and output electrical signals; a display (e.g., display 320) to output visual information (e.g., text input into user device 110); a vibrator to cause user device 110 to vibrate; and/or a camera (e.g., camera 360) to receive video and/or images.

Communication interface 430 may include, for example, a transmitter that may convert baseband signals from processing unit 400 to radio frequency (RF) signals and/or a receiver that may convert RF signals to baseband signals. Alternatively, communication interface 430 may include a transceiver to perform functions of both a transmitter and a receiver. Communication interface 430 may connect to antenna assembly 440 for transmission and/or reception of the RF signals.

Antenna assembly 440 may include one or more antennas to transmit and/or receive RF signals over the air. Antenna assembly 440 may, for example, receive RF signals from communication interface 430 and transmit them over the air, and receive RF signals over the air and provide them to communication interface 430. In one implementation, for example, communication interface 430 may communicate with a network and/or devices connected to a network (e.g., network 170).

As will be described in detail below, user device 110 may perform certain operations described herein in response to processing unit 400 executing software instructions of an application contained in a computer-readable medium, such as memory 410. The software instructions may be read into memory 410 from another computer-readable medium or from another device via communication interface 430. The software instructions contained in memory 410 may cause processing unit 400 to perform processes that will be described later. Alternatively, hardwired circuitry may be used in place of or in combination with software instructions to implement processes described herein. Thus, implementations described herein are not limited to any specific combination of hardware circuitry and software.

Although FIG. 4 shows exemplary components of user device 110, in other implementations, user device 110 may contain fewer, different, or additional components than depicted in FIG. 4. In still other implementations, one or more components of user device 110 may perform one or more other tasks described as being performed by one or more other components of user device 110.

Figure 5C:
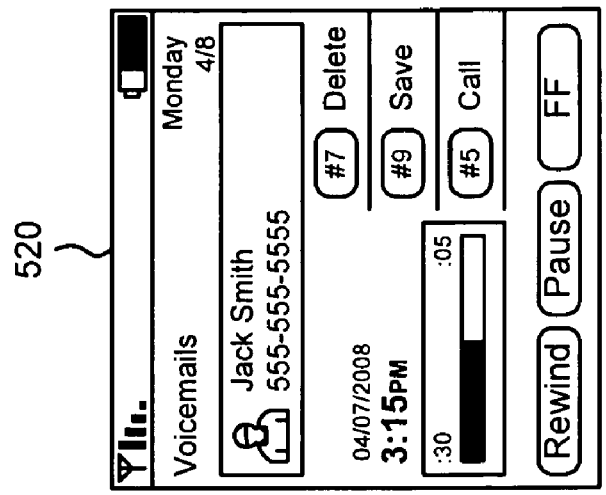
FIGS. 5A-5C depict diagrams of exemplary user interfaces capable of being generated by the user device and/or the VVM server of the network depicted in FIG. 1 during execution of a visual voicemail (VVM) application.
Figure 5B:
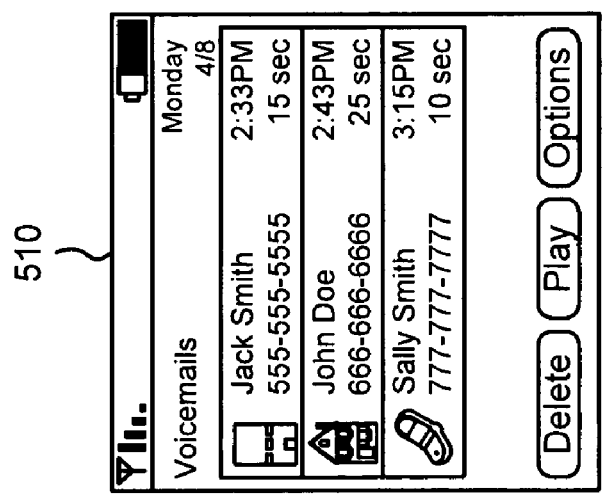
Figure 5A:
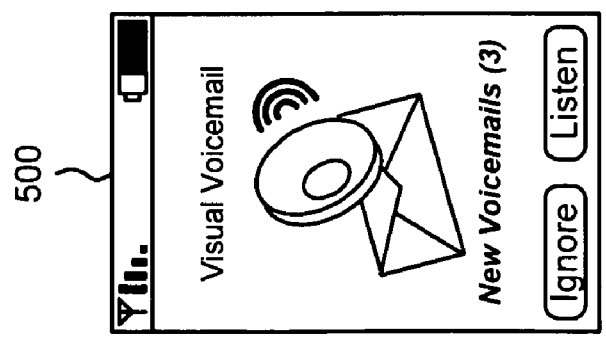

FIGS. 5A-5C depict diagrams of exemplary user interfaces capable of being generated by user device 110 and/or VVM server 120 during execution of a visual voicemail (VVM) application. User interfaces depicted in FIGS. 5A-5C (collectively referred to as "the user interfaces"), may include graphical user interfaces (GUIs) or non-graphical user interfaces, such as text-based interfaces. The user interfaces may provide information to users via customized interfaces (e.g., proprietary interfaces) and/or other types of interfaces (e.g., browser-based interfaces, television interfaces, etc.). The user interfaces may receive user inputs via one or more input devices (e.g., input device 260), may be user-configurable (e.g., a user may change the size of the user interfaces, information displayed in the user interfaces, color schemes used by the user interfaces, positions of text, images, icons, windows, etc., in the user interfaces, etc.), and/or may not be user-configurable. The user interfaces may be displayed to a user via one or more output devices (e.g., display 320).

If a new voicemail is recorded for a user's voice mailbox (e.g. a user associated with user device 110), VM server 160 may notify VVM server 120 about the new voicemail. VVM server 120 may connect to VM server 160, and may receive, from VM server 160, a list of voicemail identifiers (IDs) provided in the user's voice mailbox. Notification server 130 may send a notification to user device 110 along with the list of voicemail IDs. Upon receipt of the notification, the VVM application provided on user device 110 may cause user device 110 to compare the list of voicemail IDs with a list of voicemail IDs stored on user device 110 in order to determine if data calls are needed for voicemail synchronization. If there are new voicemails, user device 110 may retrieve the new voicemails, may start the voicemail synchronization (e.g., to delete, change status, and/or download new voicemails), and may save the new voicemails to user device 110. In one exemplary implementation, user device 110 may retrieve the new voicemails in a format specified for user device 110 along with a session cookie obtained during authentication/login of user device 110.

As illustrated in FIG. 5A, a user interface 500 may provide a new voicemail notification if a new voicemail is recorded in a user's voice mailbox and is retrieved by user device 110. User interface 500 may display a number of new voicemails received by the user (e.g., as shown in FIG. 5A, user interface 500 may indicate that three new voicemails have been received). The user may listen to the voicemails (e.g., by selecting a "Listen" button), or may ignore the voicemails (e.g., by selecting an "Ignore" button) with user device 110.

If the user associated with user device 110 selects the "Listen" button, a user interface 510 (FIG. 5B) may be displayed to the user. User interface 510 may provide a list of voicemails and associated information (e.g., a name of the voicemail recorder, a telephone number of the voicemail recorder, an icon indicating a device associated with the voicemail recorder, a time of receipt of the voicemail, a duration associated with the voicemail, etc.). In one exemplary implementation, user interface 510 may provide the list of voicemails with the most recent (or most urgent) voicemails displayed on top. The user (e.g., via user device 110) may interact with user interface 510. For example, the user may scroll up or down the list of voicemails, may select one or more voicemails to listen to, may call a voicemail recorder, may delete a voicemail, may save a voicemail, etc. The user (e.g., via user device 110) may also reply to a voicemail by sending a SMS message, an email, or a recorded message from user device 110 to the voicemail recorder. In one example, the user may delete a voicemail (e.g., by selecting a "Delete" button), may listen to a voicemail (e.g., by selecting a "Play" button"), and/or may access other options (e.g., by selecting an "Options" button).

Selection of the "Delete" button may cause user device 110 to delete one or more selected voicemails from user device 110 and from VVM server 120. In one implementation, when voicemails are deleted, user device 110 may store the deleted voicemails (e.g., in a recycle bin), and may permit the user to permanently delete the voicemails in the recycle bin (e.g., empty the recycle bin) at a future time. For example, user device 110 may provide a batch delete command and a list of IDs of the voicemails provided in the recycle bin to VVM server 120, and VVM server 120 may delete the voicemails in the recycle bin. In another implementation, if memory is low, user device 110 may issue a warning to empty the recycle bin when the VVM application is initiated by user device 110.

In one example, if the user (e.g., via user device 110) selects one of the voicemails (e.g., the voicemail from "Jack Smith") and selects the "Play" button, a user interface 520 (FIG. 5C) may by displayed to the user. User interface 520 may include a name (e.g., "Jack Smith") associated with the voicemail recorder, a telephone number (e.g., "555-555-5555") associated with the voicemail recorder, a time and/or date (e.g., "04/07/2008" at "3:15 PM") associated with the voicemail, an option to delete the voicemail (e.g., "#7—Delete"), an option to save the voicemail (e.g., "#9—Save"), and an option to call the voicemail recorder (e.g., "#5—Call"). The user may rewind the voicemail (e.g., by selecting a "Rewind" button), may pause the voicemail (e.g., by selecting a "Pause" button), and/or may fast forward the voicemail (e.g., by selecting a "FF" button).

If the user selects the "Options" button (FIG. 5B), user device 110 may provide the user with a variety of voicemail management options (e.g., a call back option, a save option, a reply option, a forward option, a compose option, etc.). The call back option of the VVM application may permit the user to call back the voicemail recorder directly (e.g., via a click-to-dial mechanism). The save option of the VVM application may enable the user to save a voicemail (e.g., stored on VM server 160) for a specific time period (e.g., a number of days, weeks, etc.). In one implementation, if the user plays a voicemail message, user device 110 may automatically instruct VM server 160 to save the voicemail.

The reply option of the VVM application may enable the user to reply to a voicemail in a variety of ways. In one example, the user (e.g., via user device 110) may reply to a voicemail by recording a new voicemail message, and instructing VM server 160 to place the new voicemail message in the initial voicemail recorder's mailbox. In another example, the user (e.g., via user device 110) may reply to a voicemail by sending a SMS message directly to a user device associated with the voicemail recorder. In still another example, the user (e.g., via user device 110) may reply to a voicemail by sending an email directly to the voicemail recorder's email address.

The forward option of the VVM application may enable the user to forward a voicemail in a variety of ways. In one example, the user (e.g., via user device 110) may forward a voicemail to a recipient by depositing the voicemail in a mailbox (e.g., stored on VM server 160) associated with the recipient. In another example, the user (e.g., via user device 110) may forward a voicemail by sending the voicemail via a multimedia messaging service (MMS) message directly to a user device associated with the recipient. In still another example, the user (e.g., via user device 110) may forward a voicemail by sending the voicemail via an email directly to the recipient's email address.

The compose option of the VVM application may enable the user to compose and send a new voicemail to a destination. For example, the user (e.g., via user device 110) may select one or more destinations for a new voicemail from a voicemail list, an address book, a call log, etc. User device 110 may verify the selected destinations. The user (e.g., via user device 110) may record the new voicemail, may listen to the new voicemail, and/or may edit the new voicemail accordingly. The user (e.g., via user device 110) may provide the new voicemail to the selected destinations (e.g., via VVM server 120). In one implementation, the selected destinations may include one or more mailboxes stored on VM server 160.

Although user interfaces 500-520 depict a variety of information, in other implementations, user interfaces 500-520 may depict less, additional, different, or differently arranged information than depicted in FIGS. 5A-5C. Furthermore, although certain features associated with the VVM application have been described above in connection with FIGS. 5A-5C, in other implementations, the VVM application may include additional or different features than described above in connection with FIGS. 5A-5C. For example, the VVM application may aggregate and support several voice mailboxes (e.g., a home voice mailbox, a work voice mailbox, a wireless voice mailbox, etc.) provided by VM server 160. VVM server 120 may retrieve voicemails from the multiple voice mailboxes (e.g., provided by VM server 160), and may combine them into a single voice mailbox before providing the voicemails to an access point (e.g., user device 110). In another example, the VVM application may link multiple electronic address books (e.g., a home electronic address book, a work electronic address book, a wireless electronic address book, etc.) into a single, aggregated electronic address book so that calling information (e.g., name, home address, email address, etc.) may be linked together for VVM management (e.g., reply, forward, etc.). In still another example, the VVM application may support multiple access points so that a user may view the VVM application via a variety of user devices (e.g., a cell phone, a PDA, a personal computer, etc.).

Figure 6:
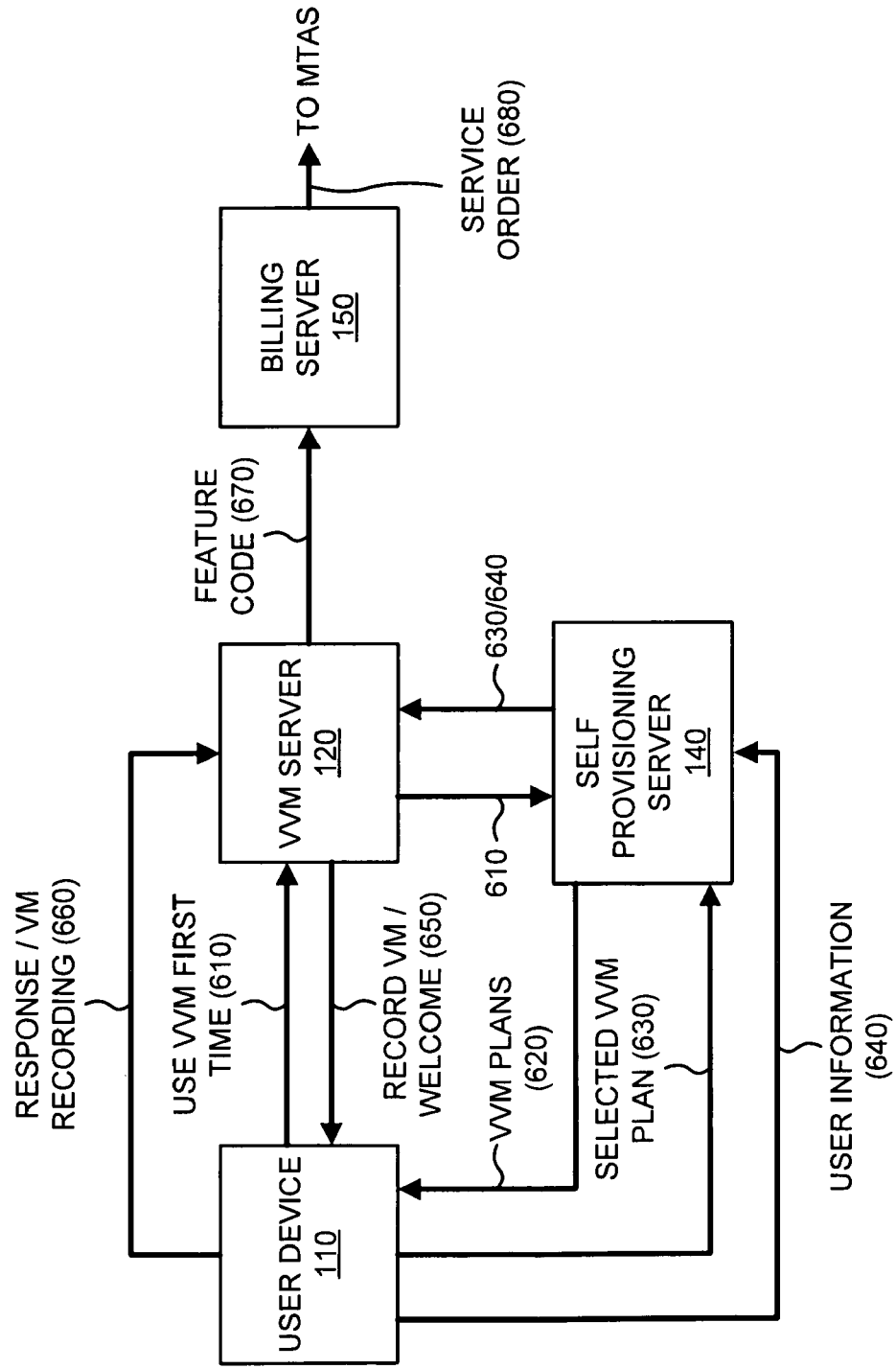
FIG. 6 illustrates a diagram of an exemplary visual voicemail provisioning operation capable of being performed by an exemplary portion of the network depicted in FIG. 1.

FIG. 6 illustrates a diagram of an exemplary visual voicemail (VVM) provisioning operation capable of being performed by an exemplary portion 600 of network 100. As illustrated, exemplary network portion 600 may include user device 110, VVM server 120, self provisioning server 140, and billing server 150. User device 110, VVM server 120, self provisioning server 140, and billing server 150 may include the features described above in connection with, for example, FIG. 1.

A user associated with user device 110 may launch a VVM application for the first time, and user device 110 (e.g., via the VVM application) may connect with VVM server 120. The user may be a new user of the VVM application, and may not be associated with a voice mailbox (e.g., stored on VM server 160). In one exemplary implementation, if the VVM application is not available to the user (e.g., because the user has not subscribed to the VVM application), user device 110 may display an error message to the user. User device 110 may provide an indication 610 of a first use of (or a request to use) the VVM application to VVM server 120, and VVM server 120 may receive indication 610. VVM server 120 may determine that the user is a new VVM user based on indication 610, and may provide indication 610 to self provisioning server 140. Self provisioning server 140 may receive indication 610, and may provide one or more VVM subscription plans 620 to user device 110. VVM subscription plans 620 may include prices, features, options, etc. associated with the VVM application. The user (e.g., via user device 110) may review VVM subscription plans 620, and may select one of VVM subscription plans 620. User device 110 may provide a selected VVM plan 630 and user information 640 to self provisioning server 140. User information 640 may include a password, profile, account, etc. information associated with the user, a mobile directory number (MDN) or a mobile identification number (MIN) associated with user device 110, etc.

Self provisioning server 140 may confirm selected VVM plan 630 and/or user information 640, and may provide selected VVM plan 630 and/or user information 640 to VVM server 120. After confirmation, VVM server 120 may provide, to user device 110, a request to record a voicemail greeting and a welcome message (as indicated by reference number 650), and user device 110 may receive request/welcome message 650. In one exemplary implementation, request/welcome message 650 may be provided to user device 110 via a new voicemail notification message (e.g., as shown in FIG. 5A). The user (e.g., via user device 110) may respond to the new voicemail notification message, and may receive request/welcome message 650. The user (e.g., via user device 110) may record a voicemail greeting, and user device 110 may provide the response to the new voicemail notification and the recorded voicemail greeting (as indicated by reference number 660) to VVM server 120. VVM server 120 may receive the recorded voicemail greeting, and may store the recorded voicemail greeting or may provide the greeting to VM server 160 (not shown).

If VVM server 120 receives selected VVM plan 630 and/or user information 640, VVM server 120 may provide a feature code 670 to a billing system (e.g., billing server 150). Feature code 670 may include a code identifying selected VVM plan 630, terms and conditions associated with selected VVM plan 630, etc. Billing server 150 may receive feature code 670, and may process the information associated with feature code 670. For example, billing server 150 may adjust the user's account information to reflect charges for the VVM application. Billing server 150 may provide a service order 680 (e.g., an order for selected VVM plan 630) to a mobile telephone activation system (MTAS), and the MTAS may provide appropriate billing information and/or records to the user and for internal reporting. At this point, the VVM application may be ready for use by user device 110. User device 110 may access the VVM application and may access the features described above in connection, for example, with FIGS. 5A-5C.

Although FIG. 6 shows exemplary components of network portion 600, in other implementations, network portion 600 may contain fewer, different, or additional components than depicted in FIG. 6. In still other implementations, one or more components of network portion 600 may perform one or more other tasks described as being performed by one or more other components of network portion 600.

Figure 7:
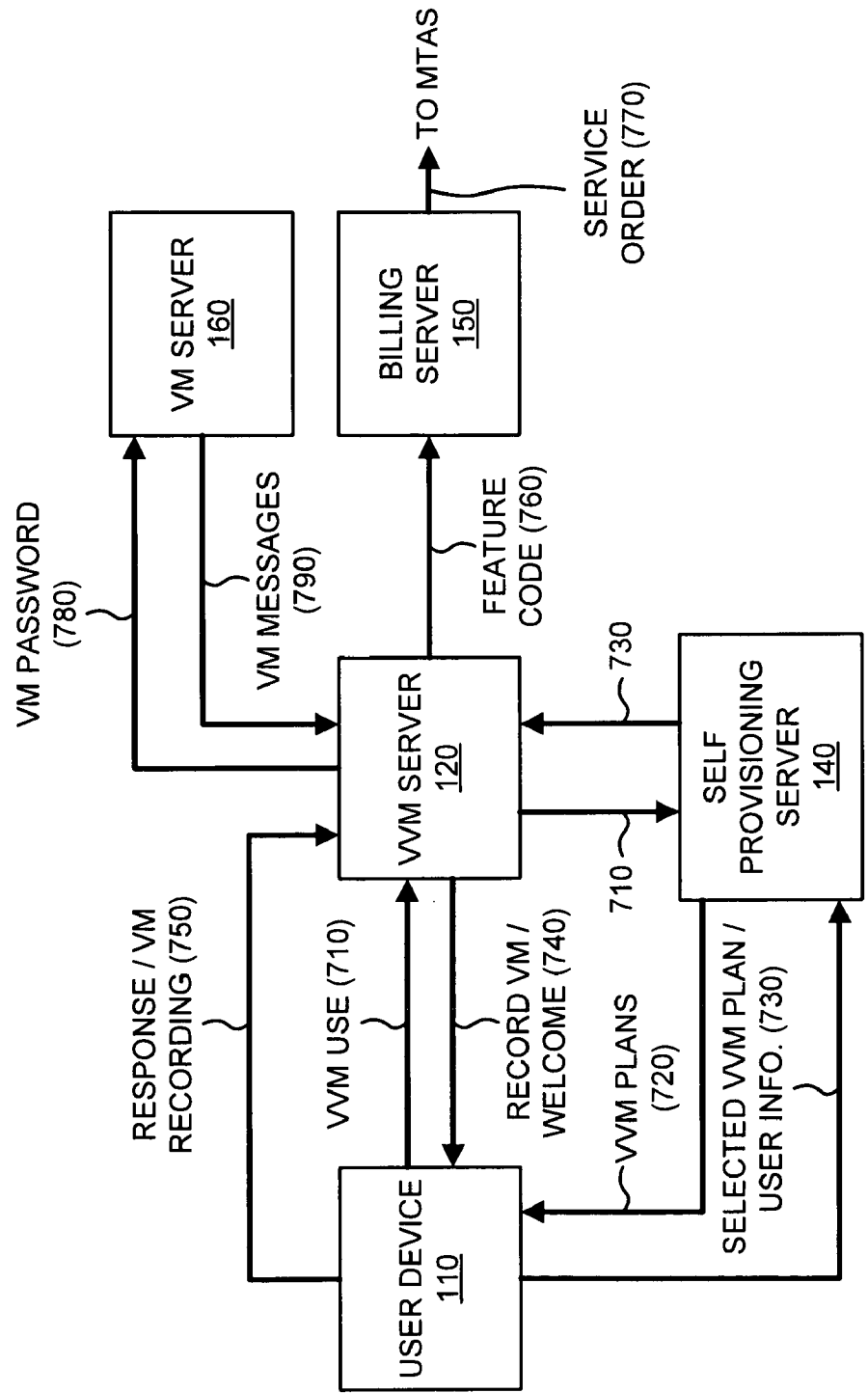
FIG. 7 depicts a diagram of another exemplary visual voicemail provisioning operation capable of being performed by an exemplary portion of the network illustrated in FIG. 1.

FIG. 7 depicts a diagram of another exemplary visual voicemail (VVM) provisioning operation capable of being performed by an exemplary portion 700 of network 100. As illustrated, exemplary network portion 700 may include user device 110, VVM server 120, self provisioning server 140, billing server 150, and VM server 160. User device 110, VVM server 120, self provisioning server 140, billing server 150, and VM server 160 may include the features described above in connection with, for example, FIG. 1.

A user associated with user device 110 may launch a VVM application for the first time, and user device 110 (e.g., via the VVM application) may connect with VVM server 120. The user may be a new user of the VVM application, but may be associated with one or more voice mailboxes (e.g., stored on VM server 160). In one exemplary implementation, if the VVM application is not available to the user, user device 110 may display an error message to the user. User device 110 may provide an indication 710 of a first use of the VVM application to VVM server 120, and VVM server 120 may receive indication 710. VVM server 120 may determine that the user is a new VVM user based on indication 710, and may provide indication 710 to self provisioning server 140. Self provisioning server 140 may receive indication 710, and may provide one or more VVM subscription plans 720 to user device 110. VVM subscription plans 720 may include prices, features, options, etc. associated with the VVM application. The user (e.g., via user device 110) may review VVM subscription plans 720, and may select one of VVM subscription plans 720. User device 110 may provide selected VVM plan/user information 730 to self provisioning server 140. Selected VVM plan/user information 730 may include a password associated with the user (e.g., for accessing VM server 160), a selected VVM subscription plan, profile, account, etc. information associated with the user, a mobile directory number (MDN) or a mobile identification number (MIN) associated with user device 110, etc.

Self provisioning server 140 may confirm selected VVM plan/user information 730, and may provide selected VVM plan/user information 730 to VVM server 120. After confirmation, VVM server 120 may provide, to user device 110, a request to record a voicemail greeting and a welcome message (as indicated by reference number 740), and user device 110 may receive request/welcome message 740. In one exemplary implementation, request/welcome message 740 may be provided to user device 110 via a new voicemail notification message (e.g., as shown in FIG. 5A). The user (e.g., via user device 110) may respond to the new voicemail notification message, and may receive request/welcome message 740. The user (e.g., via user device 110) may record a voicemail greeting, and user device 110 may provide the response to the new voicemail notification and the recorded voicemail greeting (as indicated by reference number 750) to VVM server 120. VVM server 120 may receive the recorded voicemail greeting, and may store the recorded voicemail greeting or may provide the greeting to VM server 160.

If VVM server 120 receives selected VVM plan/user information 730, VVM server 120 may provide a feature code 760 to a billing system (e.g., billing server 150). Feature code 760 may include a code identifying the selected VVM plan, terms and conditions associated with the selected VVM plan, etc. Billing server 150 may receive feature code 760, and may process the information associated with feature code 760. For example, billing server 150 may adjust the user's account information to reflect charges for the VVM application. Billing server 150 may provide a service order 770 (e.g., an order for the selected VVM plan) to a MTAS, and the MTAS may provide appropriate billing information and/or records to the user and for internal reporting. Once self provisioning has been completed, VVM server 120 may request the user to exit the VVM application, and may inform user device 110 to wait for a period of time prior to using the VVM application.

During the wait period, as further shown in FIG. 7, VVM server 120 may provide, to VM server 160, a voicemail (VM) password 780 associated with the user, and VM server 160 may validate VM password 780. In one example, VM password 780 may be provided from user device 110 to VVM server 120 via selected VVM plan/user information 730. If VM password 780 is validated, VM server 160 may provide voicemail (VM) messages 790 (e.g., new and saved voicemail messages) associated with the user to VVM server 120 for synchronization by the VVM application. Once VM messages 790 are received and synchronized by VVM server 120, the VVM application may be ready for use by user device 110. User device 110 may access the VVM application and VM messages 790, and may access the features described above in connection, for example, with FIGS. 5A-5C.

VM password 780 may be set by user device 110 according to the following pre-configuration process. The user (e.g., via user device 110) may access VM server 160 (e.g., by dialing "*86"), and may configure his/her voicemail settings (e.g., the user may create a spoken name, may record a greeting, and may set VM password 780). Once the voicemail settings are configured, VM server 160 may synchronize with VVM server 120, and VVM server 120 may receive and store VM password 780. The VVM application may enable the user to dial directly into VM server 160, and to re-configure a voicemail greeting, spoken name, and/or VM password 780.

In one exemplary implementation, self provisioning server 140 may provide messages (e.g., for display) to user device 110 that provide instructions to the user on how to complete the self provisioning of the VVM application. The messages may include success messages, failure messages, etc. The success messages may be provided to user device 110 when the VVM application has successfully self provisioned, and may include a message notifying the user that self provisioning has been successful. The failure messages may be provided to user device 110 if the VVM application fails to self provision, and may include a message requesting the user to contact customer service for assistance.

During self provisioning, the user may be notified to wait for the process to finish. If the user closes or attempts another activity (e.g., receive an incoming call) during self provisioning of the VVM application, the self provisioning may continue to execute in the background. If the user closes the VVM application and the application completes self provisioning in the background, the user may not be informed of the successful self provisioning until the user accesses the VVM application again or a new voicemail causes to the VVM application to automatically execute. If user device 110 is powered on/off while self provisioning is executing and is not complete, the user may need to manually invoke the self provisioning of the VVM application.

Once the self provisioning of the VVM application is complete, user device 110 may access VVM server 120. However, before user device 110 may connect with VVM server 120, user device 110 may be authenticated by VVM server 120 using a login mechanism (e.g., a personal identification number (PIN), a user identification, etc.). VVM server 120 may return a session cookie after authentication. Subsequent data calls (e.g., by user device 110) in a session may be validated through the session cookie. The session cookie may expire after a specified time period (e.g., fifteen minutes) or when user device 110 stops using the VVM application.

Although FIG. 7 shows exemplary components of network portion 700, in other implementations, network portion 700 may contain fewer, different, or additional components than depicted in FIG. 7. In still other implementations, one or more components of network portion 700 may perform one or more other tasks described as being performed by one or more other components of network portion 700.

Figure 8:
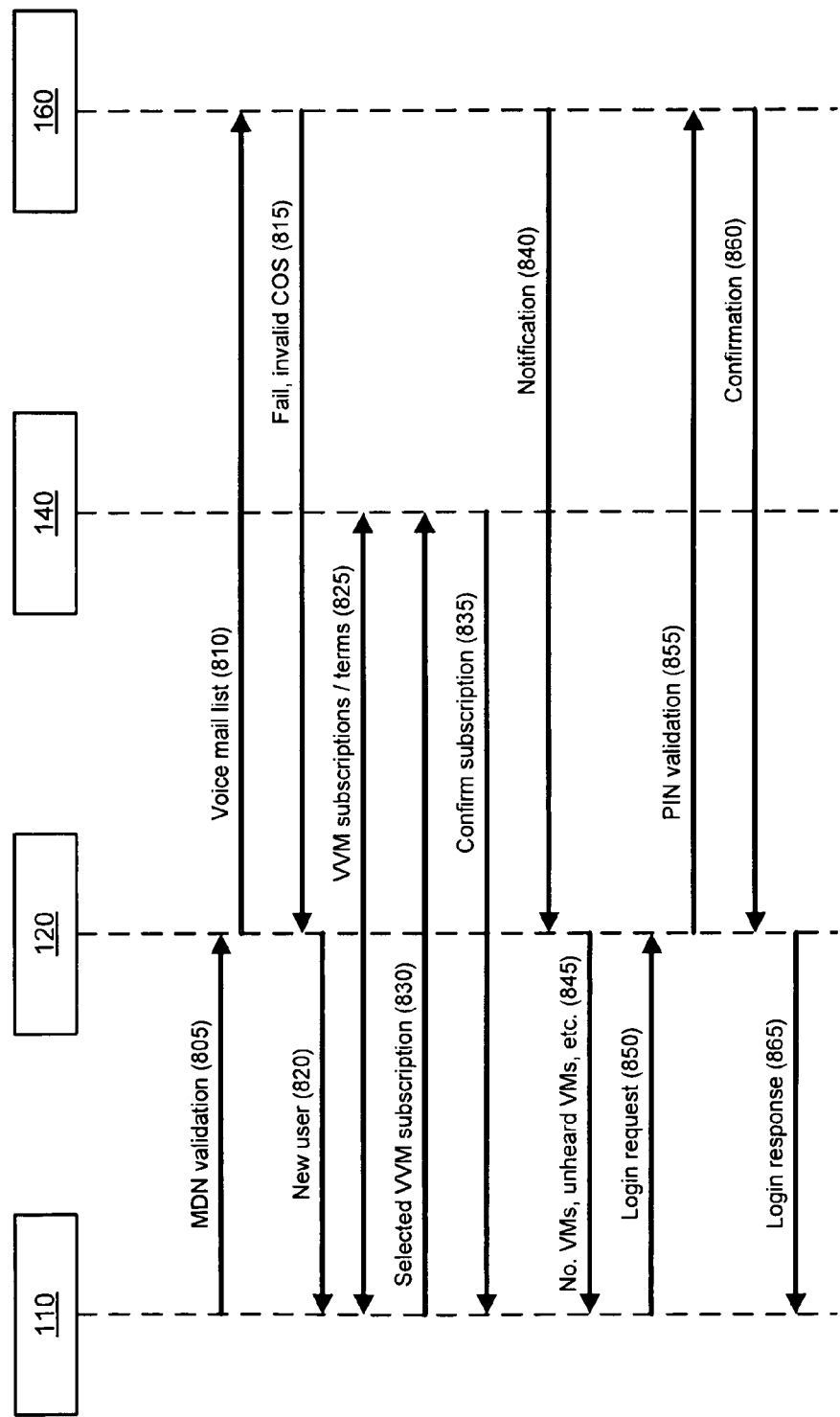
FIG. 8 illustrates an exemplary visual voicemail self provisioning flow diagram capable of being performed by an exemplary portion of the network depicted in FIG. 1.

FIG. 8 illustrates an exemplary visual voicemail self provisioning flow diagram capable of being performed by an exemplary portion 800 of network 100. As illustrated, exemplary network portion 800 may include user device 110, VVM server 120, self provisioning server 140, and VM server 160. User device 110, VVM server 120, self provisioning server 140, and VM server 160 may include the features described above in connection with, for example, FIG. 1.

The self provisioning of the VVM application may be initiated when user device 110 uses the VVM application for the first time. As shown in FIG. 8, when user device 110 uses the VVM application for the first time, user device 110 may provide a MDN validation 805 to VVM server 120. MDN validation 805 may include information (e.g., a telephone number, a PIN, etc.) identifying user device 110. VVM server 120 may receive MDN validation 805, and may provide a voice mail list 810 to VM server 160. Voice mail list 810 may include information (e.g., a MDN, a PIN, etc.) identifying user device 110. VM server 160 may receive voice mail list 810, and may determine if a user associated with user device 110 is a VVM application user. VM server 160 may determine that the user is not a VVM application user, and may provide a fail code 815 (e.g., a fail, invalid class of service (COS) error code) to VVM server 120.

VVM server 120 may receive fail code 815, and may determine that the user is a new user of the VVM application. VVM server 120 may provide a new user response 820 (e.g., that includes a uniform resource locator (URL) for user device 110 to connect to self provisioning server 140) to user device 110. User device 110 may receive new user response 820, and may connect to self provisioning server 140 via the URL provided by new user response 820. Self provisioning server 140 may provide a choice of VVM subscription plans/terms 825 to user device 110, and the user (e.g., via user device 110) may select a VVM subscription plan from VVM subscription plans/terms 825. User device 110 may provide a selected VVM subscription plan 830 to self provisioning server 140, and self provisioning server 140 may confirm 835 selected VVM subscription plan 830. After confirmation, the user may be advised to wait for a period of time (e.g., five minutes) to leave a voicemail message to test. Alternatively, user device 110 may inform VVM server 120 of the confirmation, and VVM server 120 may provide a welcome message to user device 110 after a period of time (e.g., five minutes).

Since a voice mailbox (e.g. provided in VM server 160) may be provisioned with the VVM application, VM server 160 may provide a notification 840 to VVM server 120. Notification 840 may include information 845 associated with the user's voice mailbox, such as number of voicemails, a number of unheard voicemails, etc. VVM server 120 may provide information 845 to user device 110, and user device 110 may attempt to access the VVM application. For example, user device 110 may provide a login request 850 to VVM server 120. Login request 850 may include a MDN, a PIN, etc. associated with user device 110. VVM server 120 may provide a request 855 to validate the PIN to VM server 160, and VM server 160 may receive PIN validation request 855. If the PIN is valid (e.g., the user is validated), VM server 160 may provide a confirmation 860 to VVM server 120. VVM server 120 may store the PIN, and may provide a login response 865 to user device 110. Login response 865 may include providing user device 110 access to the VVM application.

De-provisioning the VVM application may include calling a carrier's customer service center and canceling the VVM application. Removing the VVM application from user device 110 may be insufficient for de-provisioning the VVM application. Once the VVM service is canceled, the MTAS may de-provision user information stored on VVM server 120 and may modify a class of service associated with the user provided on VM server 160. After a user is de-provisioned from the VVM application, if the user attempts to the VVM application again, the user may be presented with the self provisioning described above in connection with FIGS. 6-8. If the user changes user devices (e.g., purchases a new cell phone), the user may need to download the VVM application (e.g., from VVM server 120) to the new user device. However, VVM application provisioning associated with the user on VVM server 120 and/or VM server 160 may not be impacted.

Although FIG. 8 shows exemplary components of network portion 800, in other implementations, network portion 800 may contain fewer, different, or additional components than depicted in FIG. 8. In still other implementations, one or more components of network portion 800 may perform one or more other tasks described as being performed by one or more other components of network portion 800.

Figure 9:
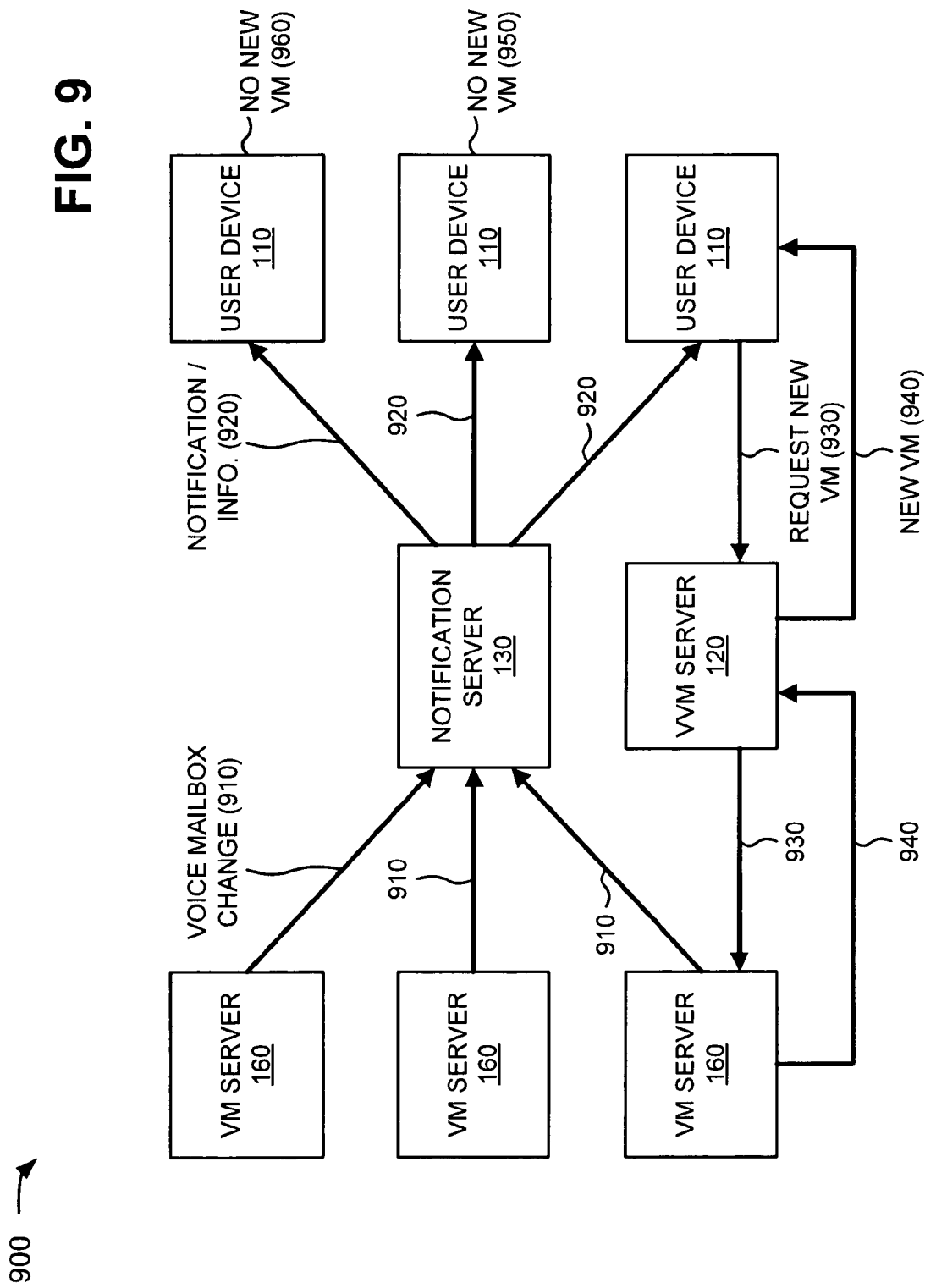
FIG. 9 depicts a diagram of a visual voicemail notification operation capable of being performed by an exemplary portion of the network illustrated in FIG. 1.

FIG. 9 depicts a diagram of a visual voicemail notification operation capable of being performed by an exemplary portion 900 of network 100. As illustrated, exemplary network portion 900 may include three user devices 110, VVM server 120, notification server 130, and three VM servers 160. User devices 110, VVM server 120, notification server 130, and VM servers 160 may include the features described above in connection with, for example, FIG. 1.

Unlike conventional voicemail notification systems where a single voice mailbox is associated with a single access point, the visual voicemail notification operation depicted in FIG. 9 includes multiple voice mailboxes (e.g., provided by multiple VM servers 160) and multiple access points (e.g., multiple user devices 110). In one exemplary implementation, one user device 110 may correspond to a cell phone, another user device 110 may correspond to a PDA, and still another user device 110 may correspond to a personal computer. In another exemplary implementation, one VM server 160 may correspond to a home VM server, another VM server 160 may correspond to a work VM server, and still another VM server 160 may correspond to a wireless VM server.

As further shown in FIG. 9, if voice mailboxes associated with users of VM servers 160 change (e.g., a new voicemail is received, a voicemail status change, etc.), each of VM servers 160 may provide a voice mailbox change 910 to notification server 130. Each voice mailbox change 910 may be received by notification server 130, and may trigger notification server 130 to provide a notification and information 920 to each of user devices 110. Notification and information 920 may include a notification of voice mailbox change 910 and current status information associated with VM servers 160 (e.g., a total number of voicemails, a total number of unheard voicemails, a list of voicemail identifiers, etc.). Since notification/information 920 may include more than just a notification, notification/information 920 may enable network portion 900 to minimize data transfers between user devices 110 and VM servers 160.

Each of user devices 110 may receive notification/information 920 from notification server 130, and may compare the status information associated with VM servers 160 (e.g., provided in notification/information 920) with status information stored in each of user devices 110. Each of user devices 110 may determine if there is a new voicemail based on the comparison. For example, a particular user device 110 may determine that there is a new voicemail based on the comparison, and may provide a request 930 for a new voicemail to VVM server 120. VVM server 120 may receive request 930, and may forward request 930 to a particular VM server 160. The particular VM server 160 may receive request 930, and may forward a new voicemail 940 to VVM server 120. VVM server 120 may forward new voicemail 940 to the particular user device 110.

As further shown in FIG. 9, the other two user devices 110 may determine that there is not a new voicemail based on the comparison, as indicated by reference numbers 950 and 960. The other two user devices 110 may determine that notification/information 920 is just a voicemail status change, and may change the status information stored on the other two user devices 110 based on notification/information 920, without making additional data calls to VM servers 160. In one implementation, after receipt of notification/information 920 and/or the new voicemail, user devices 110 may synchronize their local status information with the status information associated with VM servers 160 (e.g., provided in notification/information 920), and may store the result of the synchronization.

Although FIG. 9 shows exemplary components of network portion 900, in other implementations, network portion 900 may contain fewer, different, or additional components than depicted in FIG. 9. In still other implementations, one or more components of network portion 900 may perform one or more other tasks described as being performed by one or more other components of network portion 900.

Figure 10:
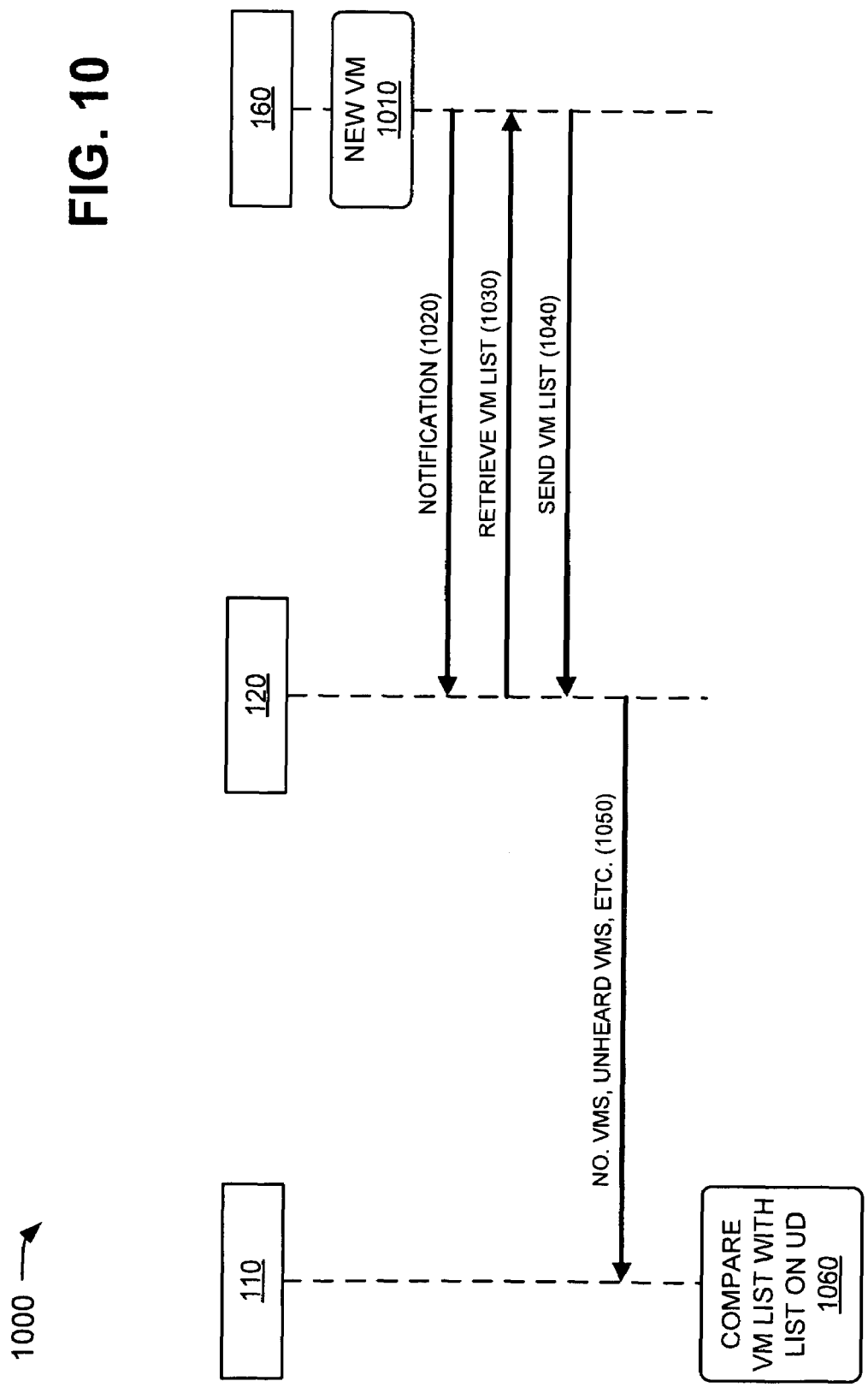
FIG. 10 illustrates an exemplary visual voicemail notification flow diagram capable of being performed by an exemplary portion of the network depicted in FIG. 1.

FIG. 10 illustrates an exemplary visual voicemail notification flow diagram capable of being performed by an exemplary portion 1000 of network 100. As illustrated, exemplary network portion 1000 may include user device 110, VVM server 120, and VM server 160. User device 110, VVM server 120, and VM server 160 may include the features described above in connection with, for example, FIG. 1.

As further shown in FIG. 10, if VM server 160 receives a new voicemail 1010 associated with a user of user device 110, VM server 160 may provide a notification 1020 to VVM server 120. VVM server 120 may receive notification 1020, may connect with VM server 160, and may provide a request 1030 to retrieve a voicemail (VM) list associated with the user to VM server 160. VM server 160 may receive request 1030, and may provide a voicemail list 1040 to VVM server 120. VVM server 120 may receive voicemail list 1040, and may provide a notification 1050 to user device 110. Notification 1050 may include a number of voicemail messages, a number of unheard voicemail messages, a list of voicemail identifiers, etc. associated with the user.

User device 110 may receive notification 1050, and may compare the list of voicemail identifiers received from VVM server 120 with a list of voicemail identifiers stored on user device 110, as shown by reference number 1060. User device 110 may decide if data calls are needed for voicemail synchronization based on the comparison. If user device 110 determines that there are one or more new voicemails, user device 110 may pre-fetch the new voicemails in the background and may start the synchronization (e.g., to retrieve the new voicemails).

Although FIG. 10 shows exemplary components of network portion 1000, in other implementations, network portion 1000 may contain fewer, different, or additional components than depicted in FIG. 10. In still other implementations, one or more components of network portion 1000 may perform one or more other tasks described as being performed by one or more other components of network portion 1000.

Figure 11:
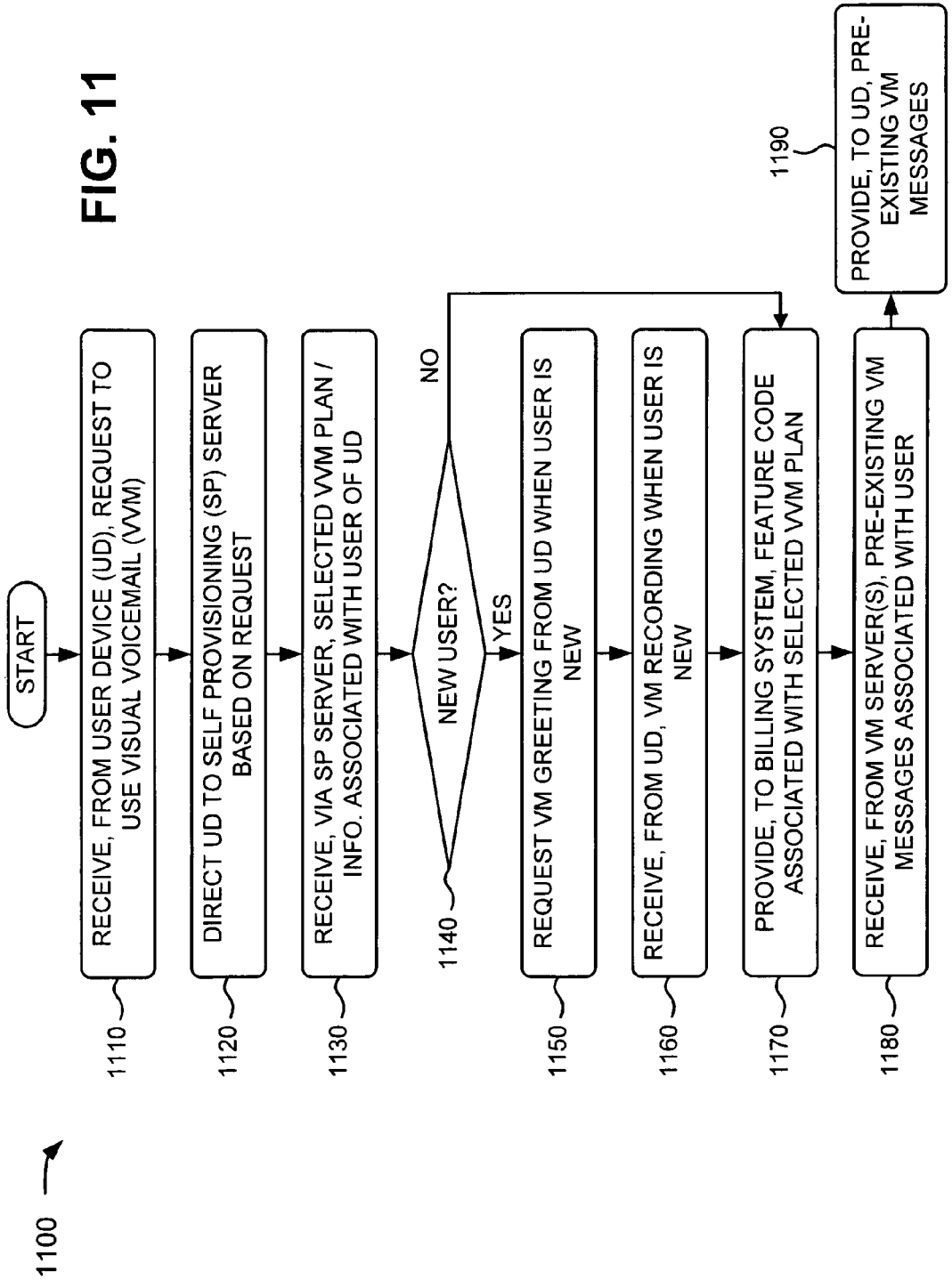

FIG. 11 illustrates a flow chart of an exemplary process 1100 for provisioning a visual voicemail (VVM) application according to implementations described herein. In one implementation, process 1100 may be performed by VVM server 120. In another implementation, some or all of process 1100 may be performed by another device or group of devices, including or excluding VVM server 120.

As illustrated in FIG. 11, process 1100 may begin with receipt, from a user device, of a request to use a visual voicemail (VVM) application (block 1110), and directing the user device to a self provisioning server based on the request (block 1120). For example, in implementations described above in connection with FIG. 6, user device 110 may provide indication 610 of a first use of the VVM application to VVM server 120, and VVM server 120 may receive indication 610. VVM server 120 may determine that the user is a new VVM user based on indication 610, and may provide indication 610 to self provisioning server 140. Self provisioning server 140 may receive indication 610, and may provide one or more VVM subscription plans 620 to user device 110. The user (e.g., via user device 110) may review VVM subscription plans 620, and may select one of VVM subscription plans 620.

As further shown in FIG. 11, a selected VVM plan and information associated with a user of the user device may be received via the self provisioning server (block 1130), and it may be determined if the user is a new user of the VVM (block 1140). If the user is a new user (block 1140—YES), a voicemail greeting may be requested from the user device (block 1150), and a voicemail recording may be received from the user device (block 1160). For example, in implementations described above in connection with FIG. 6, user device 110 may provide selected VVM plan 630 and user information 640 to self provisioning server 140. Self provisioning server 140 may provide selected VVM plan 630 and/or user information 640 to VVM server 120, and VVM server 120 may confirm selected VVM plan 630 and/or user information 640. If the user is a new user, VVM server 120 may provide, to user device 110, a request to record a voicemail greeting and a welcome message (as indicated by reference number 650), and user device 110 may receive request/welcome message 650. The user (e.g., via user device 110) may record a voicemail greeting, and user device 110 may provide the response to the new voicemail notification and the recorded voicemail greeting (as indicated by reference number 660) to VVM server 120. VVM server 120 may receive the recorded voicemail greeting, and may store the recorded voicemail greeting or may provide the greeting to VM server 160 (not shown in FIG. 6).

Returning to FIG. 11, if the user is not a new user (block 1140—NO) or after completion of blocks 1150 and 1160, a feature code associated with the selected VVM plan may be provided to the billing system (block 1170). For example, in implementations described above in connection with FIG. 6, if VVM server 120 receives selected VVM plan 630 and/or user information 640, VVM server 120 may provide feature code 670 to a billing system (e.g., billing server 150). Feature code 670 may include a code identifying selected VVM plan 630, terms and conditions associated with selected VVM plan 630, etc. Billing server 150 may receive feature code 670, and may process the information associated with feature code 670.

As further shown in FIG. 11, one or more pre-existing voicemail messages associated with the user may be received from one or more voicemail (VM) servers (block 1180), and the one or more pre-existing voicemail messages may be provide to the user device (block 1190). For example, in implementations described above in connection with FIG. 7, VVM server 120 may provide, to VM server 160, VM password 780 associated with the user, and VM server 160 may validate VM password 780. If VM password 780 is validated, VM server 160 may provide VM messages 790 (e.g., new and saved voicemail messages) associated with the user to VVM server 120 for synchronization by the VVM application. Once VM messages 790 are received and synchronized by VVM server 120, the VVM application may be ready for use by user device 110. User device 110 may access the VVM application and may access VM messages 790.

Figure 12:
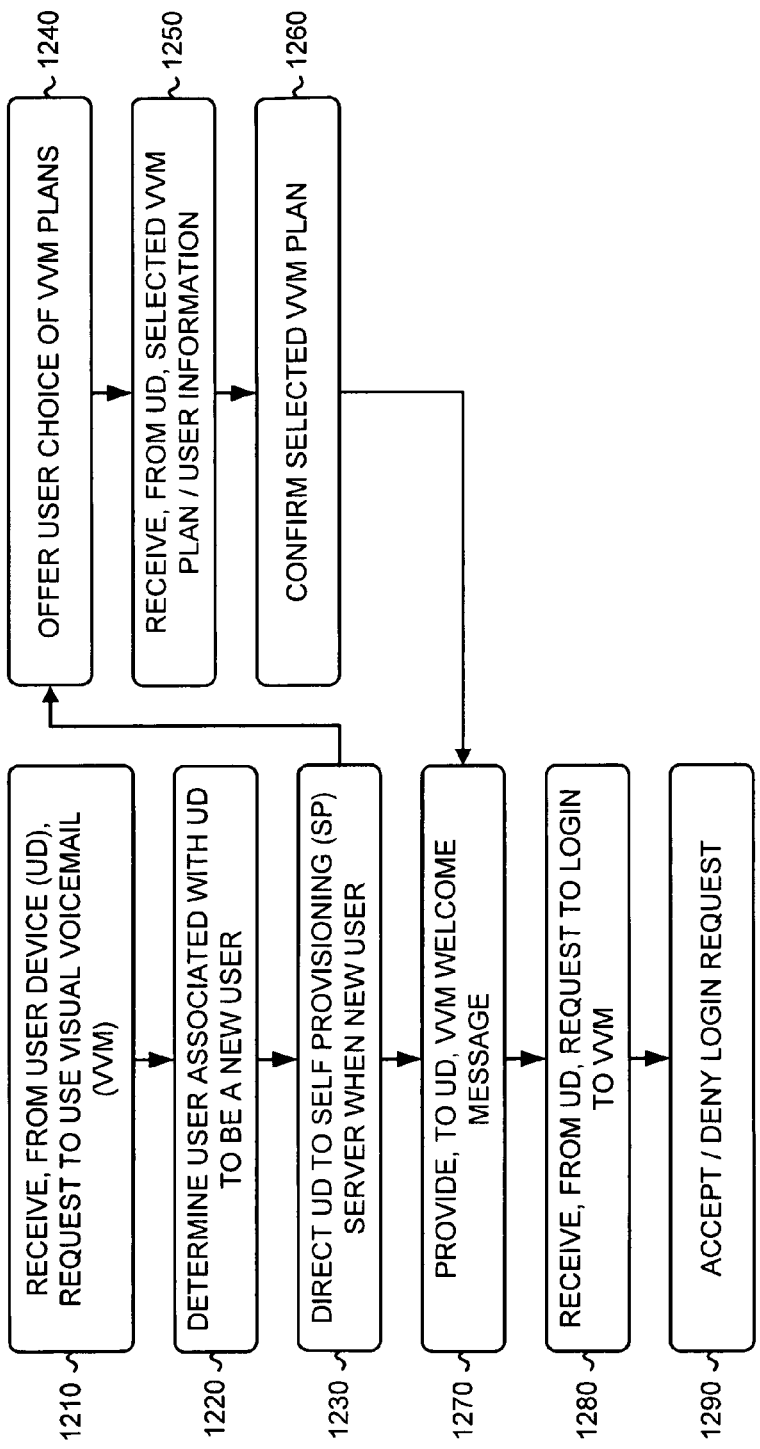

FIG. 12 illustrates a flow chart of an exemplary process 1200 for provisioning a visual voicemail (VVM) application according to implementations described herein. In one implementation, process 1200 may be performed by VVM server 120 and self provisioning server 140. In another implementation, some or all of process 1200 may be performed by another device or group of devices, including or excluding VVM server 120 and self provisioning server 140.

As illustrated in FIG. 12, process 1200 may begin with a VVM server receiving, from a user device, a request to use visual voicemail (VVM) (block 1210), determining a user associated with the user device to be a new user of the VVM (block 1220), and directing the user device to a self provisioning server when the user is new (block 1230). For example, in implementations described above in connection with FIG. 6, user device 110 may provide indication 610 of a first use of (or a request to use) the VVM application to VVM server 120, and VVM server 120 may receive indication 610. VVM server 120 may determine that the user is a new VVM user based on indication 610, and may provide indication 610 to self provisioning server 140. Self provisioning server 140 may receive indication 610, and may connect with user device 110 in order provision the VVM application to user device 110.

As further shown in FIG. 12, the self provisioning server may offer the user a choice of VVM subscription plans (block 1240), may receive, from the user device, a selected VVM subscription plan and information associated with the user (block 1250), and may confirm the selected VVM subscription plan (block 1260). For example, in implementations described above in connection with FIG. 6, self provisioning server 140 may receive indication 610, and may provide one or more VVM subscription plans 620 to user device 110. VVM subscription plans 620 may include prices, features, options, etc. associated with the VVM application. The user (e.g., via user device 110) may review VVM subscription plans 620, and may select one of VVM subscription plans 620. User device 110 may provide selected VVM plan 630 and user information 640 to self provisioning server 140. User information 640 may include a password, profile, account, etc. information associated with the user, a MDN or a MIN associated with user device 110, etc. Self provisioning server 140 may confirm selected VVM plan 630 and/or user information 640, and may provide selected VVM plan 630 and/or user information 640 to VVM server 120.

Returning to FIG. 12, the VVM server may provide, to the user device, a VVM welcome message (block 1270), may receive, from the user device, a request to login to the VVM (block 1280), and may accept or deny the login request (block 1290). For example, in implementations described above in connection with FIG. 6, VVM server 120 may provide, to user device 110, a request to record a voicemail greeting and a welcome message (as indicated by reference number 650), and user device 110 may receive request/welcome message 650. If VVM server 120 receives selected VVM plan 630 and/or user information 640, VVM server 120 may provide feature code 670 to a billing system (e.g., billing server 150). Billing server 150 may provide service order 680 (e.g., an order for selected VVM plan 630) to a MTAS, and the MTAS may provide appropriate billing information and/or records to the user and for internal reporting. At this point, the VVM application may be ready for use by user device 110. User device 110 may provide, to VVM server 120, a login request to access the VVM application, and VVM server 120 may permit or deny access to the VVM application based on the login request.

FIG. 13 illustrates a flow chart of an exemplary process 1300 for performing a visual voicemail notification operation according to implementations described herein. In one implementation, process 1300 may be performed by user device 110 and VVM server 120. In another implementation, some or all of process 1300 may be performed by another device or group of devices, including or excluding user device 110 and VVM server 120.

As illustrated in FIG. 13, process 1300 may begin with a notification server receiving, from one or more voicemail (VM) servers, change(s) to one or more voice mailboxes associated with a user (block 1310), and generating a VM notification message that includes status information associated with the one or more VM servers (block 1320). For example, in implementations described above in connection with FIG. 9, if voice mailboxes associated with users of VM servers 160 change (e.g., a new voicemail is received, a voicemail status change, etc.), each of VM servers 160 may provide voice mailbox change 910 to notification server 130. Each voice mailbox change 910 may be received by notification server 130, and may trigger notification server 130 to provide notification and information 920 to each of user devices 110. Notification and information 920 may include a notification of voice mailbox change 910 and current status information associated with VM servers 160 (e.g., a total number of voicemails, a total number of unheard voicemails, a list of voicemail identifiers, etc.).

As further shown in FIG. 13, the notification server may provide the VM notification message to one or more user devices associated with the user (block 1330), and a user device may compare the status information in the VM notification message to status information stored in the user device (block 1340). For example, in implementations described above in connection with FIG. 9, each of user devices 110 may receive notification/information 920 from notification server 130, and may compare the status information associated with VM servers 160 (e.g., provided in notification/information 920) with status information stored in each of user devices 110.

Returning to FIG. 13, the user device may determine if a new voicemail exists based on the comparison (block 1350), may request, from the one or more VM servers, the new voicemail if a new voicemail exists (block 1360), and may synchronize and/or store the status information in the VM notification message (block 1370). For example, in implementations described above in connection with FIG. 9, each of user devices 110 may determine if there is a new voicemail based on the comparison. In one example, a particular user device 110 may determine that there is a new voicemail based on the comparison, and may provide request 930 for the new voicemail to VVM server 120. VVM server 120 may receive request 930, and may forward request 930 to a particular VM server 160. The particular VM server 160 may receive request 930, and may forward a new voicemail 940 to VVM server 120. VVM server 120 may forward new voicemail 940 the particular user device 110. After receipt of the new voicemail, user devices 110 may synchronize their local status information with the status information associated with VM servers 160 (e.g., provided in notification/information 920), and may store the result of the synchronization.

As further shown in FIG. 13, the user device may generate a status change based on the status information in the VM notification if no new voicemail exists (block 1380), and process 1300 may execute block 1370, described above. For example, in implementations described above in connection with FIG. 9, the other two user devices 110 may determine that there is not a new voicemail based on the comparison, as indicated by reference numbers 950 and 960. The other two user devices 110 may determine that notification/information 920 is just a voicemail status change, and may change the status information stored on the other two user devices 110 based on notification/information 920, without making additional data calls to VM servers 160. After receipt of notification/information 920, user devices 110 may synchronize their local status information with the status information associated with VM servers 160 (e.g., provided in notification/information 920), and may store the result of the synchronization.

Figure 14:
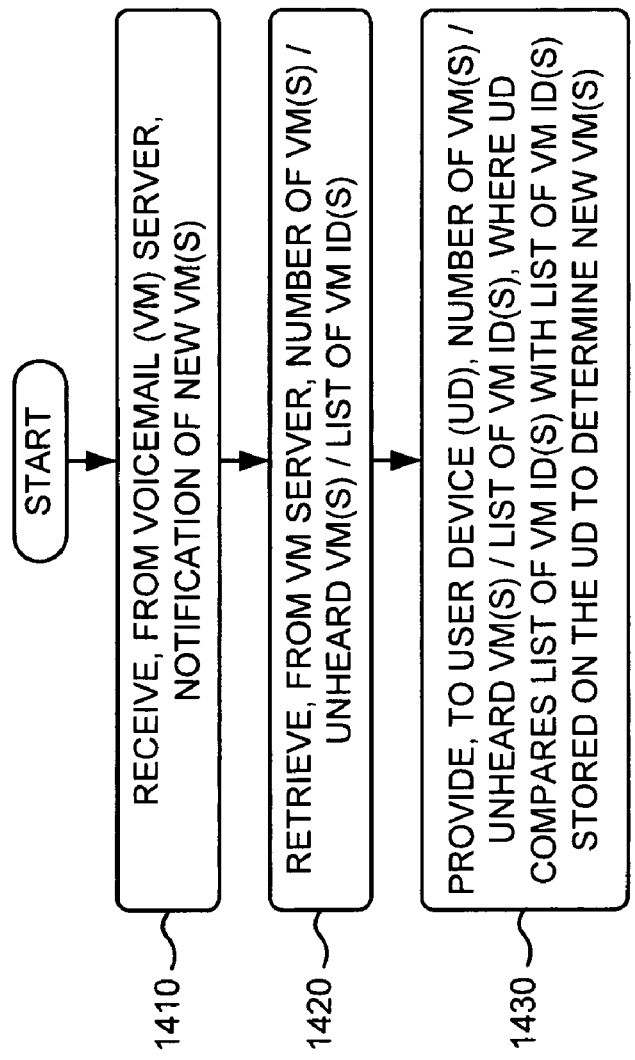

FIG. 14 illustrates a flow chart of an exemplary process 1400 for performing a visual voicemail notification operation according to implementations described herein. In one implementation, process 1400 may be performed by VVM server 120. In another implementation, some or all of process 1400 may be performed by another device or group of devices, including or excluding VVM server 120.

As illustrated in FIG. 14, process 1400 may begin with receipt, from a voicemail (VM) server, of a notification of one or more new voicemails (block 1410), and retrieval, from the VM server, of a number of voicemails, a number of unheard voicemails, and a list of voicemail identifiers (block 1420). For example, in implementations described above in connection with FIG. 10, if VM server 160 receives new voicemail 1010 associated with a user of user device 110, VM server 160 may provide notification 1020 to VVM server 120. VVM server 120 may receive notification 1020, may connect with VM server 160, and may provide request 1030 to retrieve a voicemail (VM) list associated with the user. VM server 160 may receive request 1030, and may provide voicemail list 1040 to VVM server 120. VVM server 120 may receive voicemail list 1040, and may provide notification 1050 to user device 110. Notification 1050 may include a number of voicemail messages, a number of unheard voicemail messages, a list of voicemail identifiers, etc. associated with the user.

As further shown in FIG. 14, the number of voicemails, the number unheard voicemails, and the list of voicemail identifiers may be provided to a user device, where the user device may compare the list of voicemail identifiers with a list of voicemail identifiers stored on the user device to determine the one or more new voicemails (block 1430). For example, in implementations described above in connection with FIG. 10, user device 110 may receive notification 1050, and may compare the list of voicemail identifiers received from VVM server 120 with a list of voicemail identifiers stored on user device 110, as shown by reference number 1060. User device 110 may decide if data calls are needed for voicemail synchronization based on the comparison. If user device 110 determines that there are one or more new voicemails, user device 110 may pre-fetch the new voicemails in the background and may start the synchronization (e.g., to retrieve the new voicemails).

Systems and/or methods described herein may enable a user to provision a visual voicemail (VVM) application from a variety of user devices, and may enable the VVM application to notify the user devices when a new voicemail arrives while minimizing data transfers with network devices. In one implementation, for example, the systems and/or methods may receive, from a user device, a request to use a VVM application, may direct the user device to a self provisioning server based on the request, and may receive, via the self provisioning server, a selected VVM plan and information associated with a user of the user device. The systems and/or methods may determine if the user is a new user of the VVM application, may request a voicemail greeting from the user device when the user is new, and may receive, from the user device, a voicemail recording when the user is new. The systems and/or methods may provide, to a billing system, a feature code associated with the selected VVM plan, may receive, from one or more voicemail servers, pre-existing voicemail messages associated with the user, and may provide, to the user device, the pre-existing voicemail messages.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 11-14, the order of the blocks may be modified in other implementations. Further, non-dependent blocks may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computing device-implemented method, comprising:
   receiving, from a user device, a request to use a visual voicemail (VVM) application;
   determining whether the user is a new user of the VVM application;
   directing the user device to a self provisioning server when the user is determined to be a new user of the VVM application;
   receiving, from the self provisioning server, a selected VVM subscription plan;
   requesting a voicemail greeting from the user device when the user is determined to be a new user of the VVM application;
   receiving, from the user device, a voicemail recording when the user is determined to be a new user of the VVM application;
   providing, to a billing system, a feature code associated with the selected VVM subscription plan;
   receiving, from one or more voicemail servers, pre-existing voicemail messages associated with the user; and providing, to the user device, the pre-existing voicemail messages.

2. The computing device-implemented method of claim 1, further comprising:
providing, to the user device, a VVM welcome message;
receiving, from the user device, a request to access the VVM application; and
accepting or denying the request to access the VVM application based on the information associated with the user.

3. The computing device-implemented method of claim 1, where the VVM application enables the user to manage voicemail message in a random order.

4. The computing device-implemented method of claim 1, where the feature code comprises a code identifying the selected VVM subscription plan, and terms and conditions associated with the selected VVM subscription plan.

5. The computing device-implemented method of claim 1, where the computing device comprises a VVM server.

6. The computing device-implemented method of claim 1, where the user device comprises one or more of:
a radiotelephone,
a personal communications system (PCS) terminal,
a personal digital assistant (PDA),
a laptop computer,
a personal computer,
a set-top box (STB),
a television, or
a personal gaming system.

7. The computing device-implemented method of claim 1, where the VVM welcome message comprises a request to record a voicemail greeting.

8. A computing device-implemented method, comprising:
receiving, from a plurality of voicemail servers, one or more changes to one or more voice mailboxes associated with a user;
generating a voicemail notification message that includes status information associated with the plurality of voicemail servers;
providing the voicemail notification message to a plurality of user devices associated with the user, where each of the plurality of user devices compares the status information provided in the voicemail notification message with status information stored in each of the plurality of user devices, and determines if a new voicemail associated with the user exists based on the comparison, and
generating, by each of the plurality of user devices, a status change based on the status information provided in the voicemail notification message if the new voicemail does not exist.

9. The computing device-implemented method of claim 8, further comprising:
requesting, by each of the plurality of user devices, the new voicemail from the plurality of voicemail servers if the new voicemail exists, and
synchronizing the status information provided in the voicemail notification message with the status information stored in each of the plurality of user devices.

10. The computing device-implemented method of claim 8, where the status information comprises a number of voicemails associated with the user, a number of unheard voicemails associated with the user, or a list of voicemail identifiers associated with the user.

11. A device, comprising:
a memory to store one or more instructions; and
a processor to execute the one or more instructions to cause the processor to:
receive, from a user device, a request to use a visual voicemail (VVM) application,
determine, based on the request, whether a user associated with the user device is a new user of the VVM application,
connect the user device to a self provisioning server when the user is determined to be a new user of the VVM application,
receive, from the self provisioning server, a selected VVM subscription plan and information associated with the user,
provide, to a billing system, a feature code associated with the selected VVM subscription plan, and
permit the user to access the VVM application.

12. The device of claim 11, where the processor further is to execute one or more instructions, stored in the memory, to cause the processor to:
receive, from one or more voicemail servers, pre-existing voicemail messages associated with the user, and
provide, to the user device, the pre-existing voicemail messages.

13. The device of claim 11, where the processor further is to execute one or more instructions, stored in the memory, to cause the processor to:
request a voicemail greeting from the user device when the user is determined to be a new user of the VVM application, and
receive, from the user device, a voicemail recording when the user is determined to be a new user of the VVM application.

14. The device of claim 11, where the VVM application enables the user to manage voicemail message in a random order.

15. The device of claim 11, where the feature code comprises a code identifying the selected VVM subscription plan, and terms and conditions associated with the selected VVM subscription plan.

16. The device of claim 11, where the device comprises a VVM server.

17. The device of claim 11, where the user device comprises one or more of:
a radiotelephone,
a personal communications system (PCS) terminal,
a personal digital assistant (PDA),
a laptop computer,
a personal computer,
a set-top box (STB),
a television, or
a personal gaming system.

18. The device of claim 11, where the processor further is to execute one or more instructions, stored in the memory, to cause the processor to:
provide a VVM welcome message, including a request to record a voicemail, to the user device.

19. A system, comprising:
a visual voicemail (VVM) server to:
receive, from a user device, a request to use a VVM application,
determine, based on the request, whether a user associated with the user device is a new user of the VVM application, and
connect the user device to a self provisioning server when the user is determined to be a new user of the VVM application,
where the self provisioning server is to:
offer, to the user of the user device, one or more VVM subscription plans, receive, from the user device, a selected VVM subscription plan and information associated with the user, and confirm the selected VVM subscription plan, and where the VVM server further is to:

provide, to a billing system, a feature code associated with the selected VVM subscription plan, and permit the user to access the VVM application.

20. The system of claim 19, where the VVM server further is to:

receive, from one or more voicemail servers, pre-existing voicemail messages associated with the user, and provide, to the user device, the pre-existing voicemail messages.

21. The system of claim 19, where the VVM server further is to:

request a voicemail greeting from the user device when the user is determined to be a new user of the VVM application, and receive, from the user device, a voicemail recording when the user is determined to be a new user of the VVM application.

22. The system of claim 19, further comprising:

a notification server to:

receive, from a plurality of voicemail servers, one or more changes to one or more voice mailboxes associated with the user;

generate a voicemail notification message that includes status information associated with the plurality of voicemail servers, and provide the voicemail notification message to the user device and other user devices associated with the user.

23. The system of claim 22, where each of the user devices compares the status information provided in the voicemail notification message with status information stored in each of the user devices, and determines if a new voicemail associated with the user exists based on the comparison.

24. The system of claim 22, where the VVM server further is to:

provide a VVM welcome message to the user device.

25. The system of claim 22, where the VVM welcome message comprises a request to record a voicemail greeting.

* * * * *